(12) United States Patent
Yoshioka et al.

(10) Patent No.: US 12,089,214 B2
(45) Date of Patent: Sep. 10, 2024

(54) TERMINAL, RADIO COMMUNICATION METHOD, BASE STATION, AND SYSTEM

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 278 days.

(21) Appl. No.: 17/267,292

(22) PCT Filed: Aug. 10, 2018

(86) PCT No.: PCT/JP2018/030131
§ 371 (c)(1),
(2) Date: Feb. 9, 2021

(87) PCT Pub. No.: WO2020/031382
PCT Pub. Date: Feb. 13, 2020

(65) Prior Publication Data
US 2021/0329623 A1 Oct. 21, 2021

(51) Int. Cl.
*H04W 72/21* (2023.01)
(52) U.S. Cl.
CPC .................................. *H04W 72/21* (2023.01)
(58) Field of Classification Search
CPC ............. H04W 72/21; H04W 72/1268; H04W 72/0413; H04L 5/0042; H04L 1/0003; H04L 1/0009; H04L 5/0044; H04L 1/0016; Y02D 30/50
See application file for complete search history.

(56) References Cited

U.S. PATENT DOCUMENTS

| 2018/0035459 | A1 | 2/2018 | Islam et al. | |
|---|---|---|---|---|
| 2019/0222284 | A1* | 7/2019 | Huang | H04W 72/23 |
| 2020/0196343 | A1* | 6/2020 | Marinier | H04L 5/0092 |
| 2021/0160903 | A1* | 5/2021 | Kim | H04L 5/1469 |
| 2021/0234628 | A1* | 7/2021 | Nakamura | H04W 72/1289 |
| 2021/0250870 | A1* | 8/2021 | Iwai | H04W 72/14 |

(Continued)

OTHER PUBLICATIONS

ETSI TS 136 213 V13.8.0 "LTE; Evolved Universal Terrestrial Radio Access (E-UTRA); Physical layer procedures (3GPP TS 36.213 version 13.8.0 Release 13)" Jan. 2018 (394 pages).

(Continued)

*Primary Examiner* — Ayaz R Sheikh
*Assistant Examiner* — David Zhijun Sun
(74) *Attorney, Agent, or Firm* — Osha Bergman Watanabe & Burton LLP

(57) ABSTRACT

In order to appropriately control collision processing between PUCCH/PUSCH in eMBB and PUCCH/PUSCH in URLLC in the future radio communication systems, a user terminal according to one aspect of the present invention includes: a transmitting section configured to perform uplink transmission by using at least one of a first modulation and coding scheme (MCS) table and a second MCS table having a code rate lower than a minimum code rate defined in the first MCS table; and a control section configured to control collision processing in a case where the uplink transmission with the first MCS table and the uplink transmission with the second MCS table collide with each other.

5 Claims, 13 Drawing Sheets

(56) References Cited

U.S. PATENT DOCUMENTS

2021/0298008 A1* 9/2021 Yamamoto ............ H04W 28/04

OTHER PUBLICATIONS

3GPP TSG RAN WG1 Meeting #93; R1-1807748 "Offline Discussion on Support of Separate CQI and MCS table(s) for URLLC" Ericsson; Busan, Korea; May 21-25, 2018 (15 pages).
3GPP TSG RAN WG1 Meeting #93; R1-1807495 "Proposal on collision handling for UL SPS repetition" LG Electronics; Busan, Republic of Korea; May 21-25, 2018 (4 pages).
International Search Report issued in International Application No. PCT/JP2018/030131, mailed Oct. 9, 2018 (5 pages).
Written Opinion issued in International Application No. PCT/JP2018/030131; Dated Oct. 9, 2018 (5 pages).
3GPP TSG RAN WG1 Meeting 92; R1-1802145 "UCI multiplexing of different usage scenario" ETRI; Athens, Greece; Feb. 26-Mar. 2, 2018 (3 pages).
3GPP TSG RAN WG1 Meeting #92; R1-1802002 "Multiplexing of UL Transmissions with Different Reliability Requirements" Samsung; Athens, Greece; Feb. 26-Mar. 2, 2018 (7 pages).
3GPP TSG RAN WG1 Meeting #92bis; R1-1804739 "CQI and MCS tables for NR URLLC" Intel Corporation; Sanya, China; Apr. 16-20, 2018 (10 pages).
Extended European Search Report issued in European Application No. 18929177.6, dated Feb. 22, 2022 (10 pages).
Office Action issued in Japanese Application No. 2020-535472; Dated Oct. 11, 2022 (10 pages).
Office Action issued in counterpart European Patent Application No. 18 929 177.6 mailed on Jun. 6, 2023 (6 pages).
ZTE, Sanechips; "Considerations on CQI /MCS table(s) and related aspects for URLLC", 3GPP TSG RAN WG1 Meeting #92bis, R1-1805515; Sanya, China, Apr. 16-20, 2018 (21 pages).
Vivo; "Remaining issues on UL data transmission for URLLC", 3GPP TSG RAN WG1 Meeting #92bis, R1-1806070; Busan, Korea, May 21-25, 2018 (5 pages).
Office Action issued in the counterpart Chinese Application No. 201880098574.3, mailed Aug. 31, 2023 (18 pages).

* cited by examiner

FIG. 2A

| SCS | $N_1$ [symbols] | | | |
|---|---|---|---|---|
| | Capability 1 | | Capability 2 | |
| | Without additional DMRS | With additional DMRS | Without additional DMRS | With additional DMRS |
| 15 | 8 | 13 | 3 | [13] |
| 30 | 10 | 13 | 4.5 | [13] |
| 60 | 17 | 20 | 9 (FR1) | [20] |
| 120 | 20 | 24 | - | - |

FIG. 2B

| $d_{1,1}$ [symbols] | |
|---|---|
| HARQ-ACK on PUCCH | HARQ-ACK on PUSCH |
| 0 | 1 |

FIG. 2C

| | $d_{1,2}$ [symbols] | | | |
|---|---|---|---|---|
| | Mapping type A | | Mapping type B | |
| | Capability 1 | | Capability 1 | Capability 2 |
| Mapping type A | 4 symbol PDSCH | 2 symbol PDSCH | 2 symbol PDSCH | 2 or 4 symbol PDSCH | 30 kHz SCS and over 136 PRBs |
| 7 − (last symbol of PDSCH) | 3 | 3 + (*) | (*) | Same as capability 1 |

FIG. 3A

| SCS | $N_2$ [symbols] | |
|---|---|---|
| | Capability 1 | Capability 2 |
| 15 | 8 | 13 |
| 30 | 10 | 13 |
| 60 | 17 | 20 |
| 120 | 20 | 24 |

FIG. 3B

| $d_{2,1}$ [symbols] | |
|---|---|
| First symbol: DMRS only | Otherwise |
| 0 | 1 |

FIG. 4B

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 4A

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

FIG. 5

TERMINAL, RADIO COMMUNICATION METHOD, BASE STATION, AND SYSTEM

TECHNICAL FIELD

The present invention relates to a user terminal in next-generation mobile communication systems.

BACKGROUND ART

In the existing long term evolution (LTE) systems (for example, Rel. 8-14), a user terminal (user equipment (UE)) controls reception of a downlink shared channel (for example, physical downlink shared channel (PDSCH)) on the basis of downlink control information (DCI) (that is also referred to as a DL assignment) transmitted via a downlink control channel (for example, physical downlink control channel (PDCCH)).

In the existing LTE systems (for example, Rel. 8-14), the user terminal (UE) transmits uplink control information (UCI) by using at least one of an uplink (UL) data channel (for example, physical uplink shared channel (PUSCH)) and a UL control channel (for example, physical uplink control channel (PUCCH)).

The UCI may include, for example, a hybrid automatic repeat request acknowledgement (HARQ-ACK), a scheduling request (SR), and channel state information (CSI) for the downlink shared channel (PDSCH) (Non-Patent Literature 1).

CITATION LIST

Non-Patent Literature

Non-Patent Literature 1: 3GPP TS 36.213 V13.8.0 "Evolved Universal Terrestrial Radio Access (E-UTRA); Physical layer procedures (Release 13)", December 2017

SUMMARY OF INVENTION

Technical Problem

For the future radio communication systems (for example, new radio (NR)), conceivable are use cases of, for example, further advancement of mobile broadband (enhanced mobile broadband (eMBB)), massive machine type communications (mMTC) that achieves multiple simultaneous connections, and ultra-reliable and low-latency communications (URLLC). For example, URLLC requires higher latency reduction than eMBB and higher reliability than eMBB.

The performance requirements of URLLC are different from those of eMBB. Thus, in order to meet each performance requirement, it is necessary to avoid multiplexing on the same resource. In the current specifications, however, it is not avoided that at least one of PUCCH and PUSCH (hereinafter, also referred to as PUCCH/PUSCH) in eMBB and the PUCCH/PUSCH in URLLC are multiplexed.

The present invention has been made in view of the above, and it is therefore an object of the present invention is to provide a user terminal capable of appropriately controlling collision processing between PUCCH/PUSCH in eMBB and PUCCH/PUSCH in URLLC in the future radio communication systems.

Solution to Problem

A user terminal according to one aspect of the present invention includes: a transmitting section configured to perform uplink transmission by using at least one of a first modulation and coding scheme (MCS) table and a second MCS table having a code rate lower than a minimum code rate defined in the first MCS table; and a control section configured to control collision processing in a case where the uplink transmission with the first MCS table and the uplink transmission with the second MCS table collide with each other.

Advantageous Effects of Invention

According to the present invention, in the future radio communication systems, collision processing between PUCCH/PUSCH in eMBB and PUCCH/PUSCH in URLLC can be controlled appropriately.

BRIEF DESCRIPTION OF DRAWINGS

FIGS. 2A, 2B, and 2C explanatorily illustrate parameters indicated in FIG. 1.

FIGS. 3A and 3B explanatorily illustrate parameters indicated in FIG. 1.

FIGS. 4A and 4B illustrate exemplary MCS tables 1 and 2, respectively.

FIG. 5 illustrates an exemplary MCS table 3.

DESCRIPTION OF EMBODIMENTS

For the future radio communication systems (for example, NR and Rel. 15 or subsequent version), in a case where transmission of a certain user terminal collides, collision processing between PUCCH and PUSCH is applied as long as a timeline requirement is satisfied.

Figure 1:
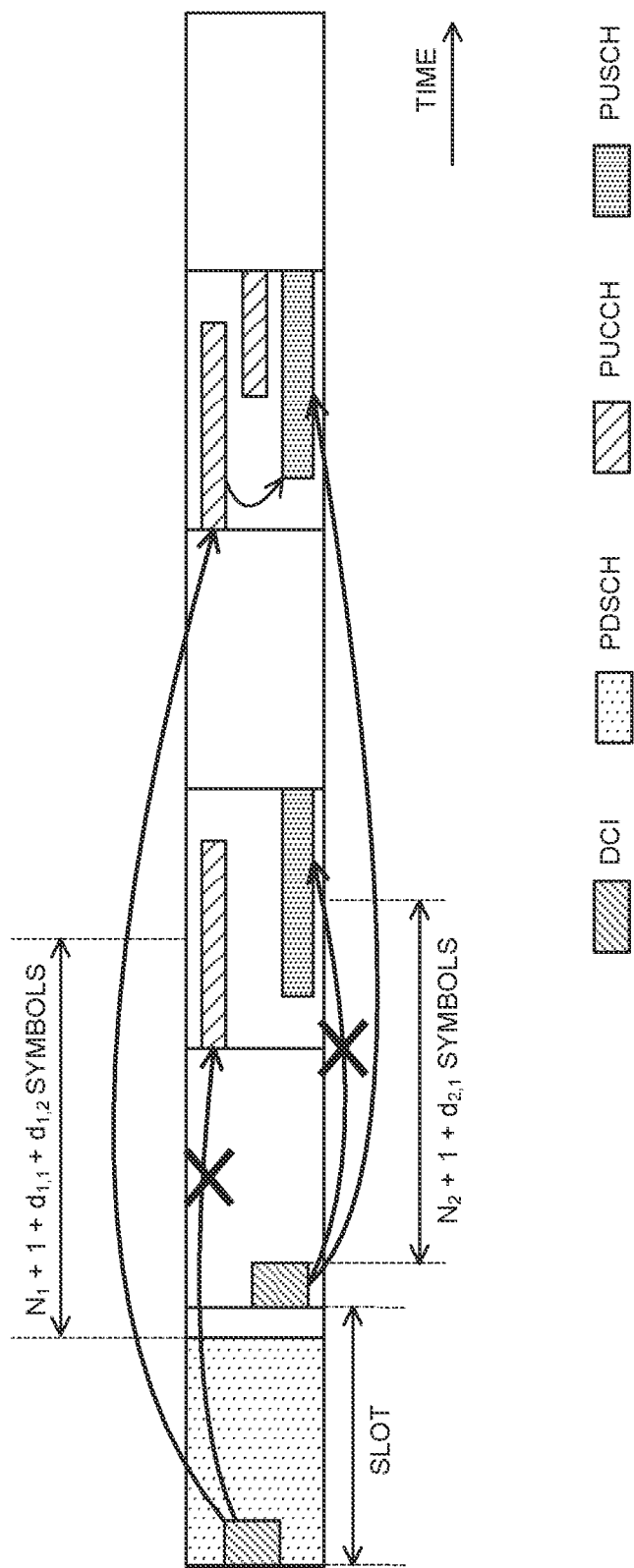
FIG. 1 illustrates exemplary collision processing between PUCCH and PUSCH in a future radio communication system.

FIG. 1 illustrates exemplary collision processing between PUCCH and PUSCH in a future radio communication system. In the example illustrated in FIG. 1, PUCCH and PUSCH collide in the same slot. Specifically, the PUCCH starting from the symbol next to the last symbol of the PDSCH to later of the $N_1^+ + d_{1,1} + d_{1,2}$ ($= N_1 + 1 + d_{1,1} + d_{1,2}$) symbols and the PUSCH transmitted from the symbol next to the last symbol of the DCI in the second slot from the left to later of the $N_2^+ + d_{2,1}$ ($= N_2 + 1 + d_{2,1}$) symbols collide in the second slot from the right.

As illustrated in FIG. 2A, $N_1$ is the number of symbols determined on the basis of at least one of the following parameters:

Type of processing capability (UE processing capability, capability) related to the processing time of PDSCH of the user terminal (for example, 1 or 2)

Subcarrier spacing (SCS)

Addition or non-addition of a demodulation reference signal (DMRS) of the PDSCH (presence or no presence of an additional DMRS)

Frequency range

As illustrates in FIG. 2B, $d_{1,1}$ is the number of symbols determined on the basis of which of PUCCH or PUSCH is used to feed back an HARQ-ACK.

As illustrated in FIG. 2C, $d_{1,2}$ is the number of symbols determined on the basis of at least one of the following parameters.

Type of UE processing capability (for example, 1 or 2)

PDSCH mapping type (for example, A or B)

The number of symbols assigned to PDSCH (for example, 2 or 4 symbols)

Resource block (RB) (also referred to as a physical resource block (PRB)) scheduled for the PDSCH As illustrated in FIG. 3A, $N_2$ is the number of symbols determined on the basis of at least one of a type of capability related to the preparation time of PUSCH transmission (PUSCH timing capability) (for example, 1 or 2) and sub-carrier intervals (SCS).

As illustrated in FIG. 3B, $d_{2,1}$ is the number of symbols determined on the basis of whether the first symbol assigned to the PUSCH is composed only of the DMRS of the PUSCH.

In the example illustrated in FIG. 1, in the third slot from the left, the two PUCCHs are not transmitted and the UCI to be transmitted via the two PUCCHs is piggybacked (carried) on the PUSCH. That is, the UCI is transmitted by use of the PUSCH.

Although not illustrated in FIG. 1, in a case where a plurality of PUCCHs collides without a PUSCH in a slot, the HARQ-ACK is multiplexed on at least one of the CSI and SR and then transmitted by use of a single PUCCH.

For the future radio communication systems (for example, new radio (NR)), conceivable are use cases of, for example, further advancement of mobile broadband (enhanced mobile broadband (eMBB)), massive machine type communications (mMTC) that achieves multiple simultaneous connections, and ultra-reliable and low-latency communications (URLLC). For example, URLLC requires higher latency reduction than eMBB and higher reliability than eMBB.

As described above, for the future radio communication systems, it is conceivable that a plurality of services having different requirements for latency reduction and reliability will coexist. Thus, it is considered to flexibly control the transmission and reception of signals for the plurality of services having different requirements.

For the future radio communication systems (for example, NR), in order to support various use cases, it is conceivable that a new modulation and coding scheme (MCS) table and a new channel quality indicator (CQI) table that are not defined in the existing LTE systems are introduced. Such a new table may have contents in which candidates (indexes) having a lower code rate in comparison with the existing table are defined.

In introduction of a new MCS table, it is also considerable that a new radio network temporary identifier (RNTI) for specifying the new MCS table (that may be referred to as an MCS RNTI) may be used. Examples of the MCS table and the RNTI newly introduced in NR will be described below.

<MCS Table>

In the future radio communication systems (for example, NR), it has been considered that on a basis of a given field contained in DCI, at least one of the modulation scheme (or modulation order) and the code rate (modulation order/code rate) of a physically shared channel scheduled by the DCI. For example, the user terminal controls reception processing of a PDSCH on the basis of the MCS field contained in the DCI (for example, DCI format 1_0, DCI format 1_1) that schedules the PDSCH.

Specifically, the user terminal receives a PDSCH on the basis of an MCS index, a table defined by associating a modulation order with a code rate (also referred to as an MCS table), and an MCS index specified by the DCI. Similarly, the user terminal transmits a PUSCH on the basis of the MCS table and an MCS index specified by the DCI that schedules the PUSCH.

Modulation orders are values corresponding one to one to modulation schemes. For example, the modulation order of quadrature phase shift keying (QPSK) corresponds to 2, the modulation order of 16 quadrature amplitude modulation (QAM) corresponds 4, the modulation order of 64QAM corresponds to 6, and the modulation order of 256QAM corresponds to 8.

FIG. 4 illustrates exemplary MCS tables. The values of the MCS tables illustrated in FIG. 4 are merely examples and thus are not limited thereto. In addition, some items associated with the MCS Index ($I_{MCS}$) (for example, spectral efficiency) may be not given or other items may be added.

In FIG. 4A, QPSK, 16QAM, and 64QAM are defined as modulation orders. In FIG. 4B, QPSK, 16QAM, 64QAM, and 256QAM are defined as modulation order. Furthermore, in FIGS. 4A and 4B, the minimum code rate (MCS index of 0) is defined to be 120 (×1024).

The MCS table in FIG. 4A may be referred to as an MCS table 1 for PDSCH, a 64QAM table, or a qam64. The MCS table in FIG. 4B may be referred to as an MCS table 2 for PDSCH a 256QAM table, or a qam256. The 64QAM table and the 256QAM table illustrated in FIG. 4 are also defined in the existing LTE systems.

In NR, also conceivable is a case (for example, URLLC) where lower latency and higher reliability than those of the existing LTE systems are required. In order to support such a case, it is conceivable that a new MCS table different from the MCS tables defined in the existing LTE systems is introduced.

FIG. 5 illustrates an exemplary new MCS table. The values of the MCS table illustrated in FIG. 5 are merely examples and thus are not limited thereto. In FIG. 5, QPSK, 16QAM, and 64QAM are defined as modulation orders, and the minimum code rate (MCS index of 0) is defined to be 30 (×1024). The MCS table in FIG. 5 may be referred to as an MCS table 3 for PDSCH, a new MCS table, or a qam64LowSE.

As described above, such a new MCS table (MCS table 3) may be a table in which a code rate (for example, 30) is defined lower than the minimum code rate (for example, 120) defined in the MCS tables (MCS table 1, MCS table 2) illustrated in FIG. 4. Alternatively, the MCS table 3 may be a table in which a code rate in the same MCS index is set lower than that of the MCS table 1 or the MCS table 2.

The user terminal may select an MCS table to be used for determining the modulation order/code rate of a PDSCH, on the basis of at least one of the following conditions (1) to (3):

(1) Whether or not a given RNTI (for example, mcs-C-RNTI) is set (2) Notification of information for specifying the MCS table (MCS table information)

(3) RNTI type applied to CRC scrambling of at least one of DCI (or PDCCH) and the PDSCH For example, it is assumed that a given RNTI (for example, that may also be referred to as an mcs-C-RNTI or MCS RNTI) is not set for the user terminal by a higher layer (for example, RRC signaling). In this case, the user terminal may determine a MCS table to be applied on the basis of MCS table information specified with a higher layer parameter (for example, mcs-table).

The MCS table information may be information for specifying any of the MCS table 1, the MCS table 2 (for example, qam256), or the MCS table 3 (for example, qam64LowSE). Alternatively, the MCS table information may be information for specifying either the MCS table 2 (for example, qam256) or the MCS table 3 (for example, qam64LowSE).

In a case where the MCS table 2 is set, the user terminal applies the MSC table 2 to control reception of PDSCH.

In a case where the new MCS table (MCS table 3) is set, the user terminal may determine an MCS table to be applied, on the basis of a search space type to be used for transmission of DCI. For example, even in a case where the new MCS table is set, the user terminal uses the MCS table 1 if DCI (for example, DCI format 0_0, DCI format 1_0) has been transmitted in the common search space. The user terminal uses the MCS table 3 in a case where the new MCS table is set and DCI (for example, DCI format 0_0, DCI format 1_0, DCI format 0_1, DCI format 1_0) has been transmitted in an UE-specific search space. MCS tables may be set one-to-one for the uplink (PUSCH transmission) and the downlink (PDSCH reception).

Next, it is assumed that a given RNTI (for example, mcs-C-RNTI) is set for the user terminal by a higher layer (for example, RRC signaling). In this case, the user terminal may determine an MCS table on the basis of an RNTI type applied to CRC scrambling of at least of DCI (or PDCCH) and a PDSCH. For example, in a case where the CRC of a PDSCH is scrambled by a given RNTI, the user terminal uses the new MCS table (MCS table 3) to receive the PDSCH.

For a PDSCH transmitted by semi-persistent scheduling (DL-SPS), a notification as to whether or not the new MCS table is set may be issued with a higher layer parameter (for example, mcs-Table). The setting of the new MCS table for DL-SPS may be set independently from DCI-based PDSCH transmission (grant-based DL scheduling).

The conditions for using the tables illustrated in FIGS. 4 and 5 are not limited to the above conditions.

As described above, in the future radio communication systems (for example, NR), a new MCS table with a lower code rate defined is supported in assumption of various use cases different in requirements (for example, eMBB, URLLC).

In the present specification, it may be assumed that at least one of downlink (DL) transmission and uplink (UL) transmission to which a new MCS table (for example, MCS table 3) is applied is URLLC. Alternatively, it may also be assumed that at least one of DL transmission and UL transmission to which an existing MCS table (for example, MCS table 1 or MCS table 2) is applied is eMBB.

It may also be assumed that, for the user terminal, URLLC is applied to a UL channel or a DL channel scheduled or triggered by DCI for indicating a new MCS table. It may also be assumed that, for the user terminal, eMBB is applied to a UL channel or a DL channel scheduled or triggered by DCI for indicating an existing MCS table. The UL channel may be a PUCCH or a PUSCH. The DL channel may be a PDSCH.

Alternatively, it may also be assumed that in a case where the user terminal receives CRC scrambled DCI (or PDCCH) with a given radio network temporary identifier (RNTI), URLLC is applied to a UL channel or a DL channel scheduled by the DCI. Different pieces of DCI (for example, DCI formats) may be applied one-to-one for URLLC and eMBB.

The performance requirements of URLLC are different from those of eMBB. Thus, in order to meet each performance requirement, it is necessary to avoid multiplexing on the same resource. In the current specifications, however, it is not avoided that at least one of PUCCH and PUSCH (hereinafter, also referred to as PUCCH/PUSCH) in eMBB and the PUCCH/PUSCH in URLLC are multiplexed.

In LTE Rel. 15, in a case where a short transmission time interval (TTI) is set, it is defined that the user terminal transmits an HARQ-ACK response associated with a subframe PUCCH, by using a slot PUCCH or a subslot PUCCH (hereinafter, also referred to as a slot/subslot PUCCH).

In a case where the slot/subslot PUCCH matches a scheduling request (SR) transmission instance, the SR prepared as part of subframe PUCCH transmission is transmitted on the slot/subslot PUCCH when the SR is not yet prepared for the slot/subslot PUCCH.

The user terminal transmits the HARQ-ACK response associated with the subframe PUCCH on the slot/subslot PUSCH.

In a case where at least one of the subframe PUSCH and the subframe PUCCH collides with the slot/subslot PUCCH, the user terminal is not expected to transmit either the subframe PUSCH or the subframe PUCCH.

Furthermore, the current specifications have no support for collision processing of inter-user terminal physical resources (for example, PDCCH, PDSCH, PUSCH, and PUCCH).

Therefore, the present inventors have specifically considered the collision processing between PUCCH/PUSCH in eMBB and PUCCH/PUSCH in URLLC in the future radio communication systems.

Hereinafter, the present embodiment will be described in detail with reference to the accompanying drawings.

(First Aspect)

In a first aspect, consideration is made in collision processing of intra-user terminal (intra-UE) physical resources (for example, PUSCH, PUCCH).

When any of the following (1) to (3) is satisfied, any of the following (1-1) to (1-4) or a combination thereof may be applied as the collision processing of the intra-user terminal (intra-UE) physical resources.

(1) A case where the PUCCH/PUSCH in URLLC triggered by DCI for indicating a new MCS table collides with the PUCCH/PUSCH in eMBB triggered by DCI for indicating an existing MCS table (case where the PUCCH/PUSCH in URLLC triggered by DCI scrambled with a given RNTI collides with the PUCCH/PUSCH in eMBB triggered by DCI scrambled with a C-RNTI (Cell-RNTI) or a CS-RNTI)

(2) A case where the PUCCH/PUSCH in URLLC triggered by the DCI for indicating the new MCS table collides with the PUCCH/PUSCH in configured grant eMBB associated with the existing MCS table (3) A case where the PUCCH/PUSCH in configured grant URLLC associated with the new MCS table collides with the PUCCH/PUSCH in eMBB triggered by the DCI for indicating the existing MCS table (1-1)

The user terminal may drop the PUCCH/PUSCH in eMBB before or after multiplexing UCI or an uplink shared channel (UL-SCH) on the resource.

The UCI of the PUCCH/PUSCH in eMBB may be piggybacked on the PUCCH/PUSCH in URLLC as long as the code rate does not exceed the maximum code rate.

The HARQ-ACK or SR of the PUCCH/PUSCH in eMBB may be piggybacked on the PUCCH/PUSCH in URLLC. The CSI of the PUCCH/PUSCH in eMBB may be dropped.

An HARQ-ACK or an SR, and CSI that associate a new CQI table (for URLLC) in the PUCCH in eMBB may be piggybacked on the PUCCH/PUSCH in URLLC. Other pieces of CSIs may be dropped.

Whether the UCI of the PUCCH/PUSCH in eMBB is piggybacked may be indicated with a higher layer parameter or DCI.

(1-2)

After multiplexing the UCI or uplink shared channel (UL-SCH) in eMBB on the resource, the user terminal may puncture the PUCCH/PUSCH in URLLC on the PUCCH/PUSCH in eMBB.

For a symbol in which the PUCCH/PUSCH in URLLC has been transmitted, the PUCCH/PUSCH in eMBB needs not be transmitted even on a non-collision PRB.

(1-3)

Before or after multiplexing the UCI or the uplink shared channel (UL-SCH) on the resource, the user terminal may delay transmission of the PUCCH/PUSCH in eMBB.

The length of the latency may be indicated with an RRC parameter or the DCI.

(1-4)

In a case where the PUCCH/PUSCH in URLLC collides with a DMRS symbol of the PUCCH/PUSCH in eMBB, the user terminal may drop the PUCCH/PUSCH in eMBB. Alternatively, the user terminal may puncture the PUCCH/PUSCH in URLLC on the PUCCH/PUSCH in eMBB.

The collision processing of the intra-user terminal (intra-UE) physical resources indicated in the first aspect enables appropriate processing of the collision between PUCCH/PUSCH in eMBB and PUCCH/PUSCH in URLLC.

(Second Aspect)

In a second aspect, consideration is made in collision processing of inter-user terminal (inter-UE) physical resources (for example, PDCCH, PDSCH, PUSCH, and PUCCH).

(2-1)

Consideration is made in support for multiplexing in a case where the eMBB uplink (UL) of a certain user terminal collides with the URLLC uplink (UL) of a different user terminal, that is, when any of the following (1) to (3) is satisfied.

(1) A case where the PUCCH/PUSCH in URLLC triggered by DCI for indicating a new MCS table collides with the PUCCH/PUSCH in eMBB triggered by DCI for indicating an existing MCS table (case where the PUCCH/PUSCH in URLLC triggered by DCI scrambled with a given RNTI collides with the PUCCH/PUSCH in eMBB triggered by DCI scrambled with a C-RNTI (Cell-RNTI) or a CS-RNTI)

(2) A case where the PUCCH/PUSCH in URLLC triggered by the DCI for indicating the new MCS table collides with the PUCCH/PUSCH in configured grant eMBB associated with the existing MCS table (3) A case where the PUCCH/PUSCH in configured grant URLLC associated with the new MCS table collides with the PUCCH/PUSCH in eMBB triggered by the DCI for indicating the existing MCS table The user terminal that has been scheduled transmission of the PUCCH/PUSCH in eMBB may expect reception of an inter-UE collision indicator having been transmitted on the basis of a field of new DCI or existing DCI in the common search space.

FIG. 6 exemplarily illustrates that the user terminal that has been scheduled the transmission of the PUCCH/PUSCH in eMBB receives the indicator and applies the collision processing. The indicator may be, for example, a slot format indicator (SFI).

In the case of having received the indicator (for example, SFI), the user terminal may drop or cancel the scheduled transmission of the PUCCH/PUSCH in eMBB.

Figure 6A:
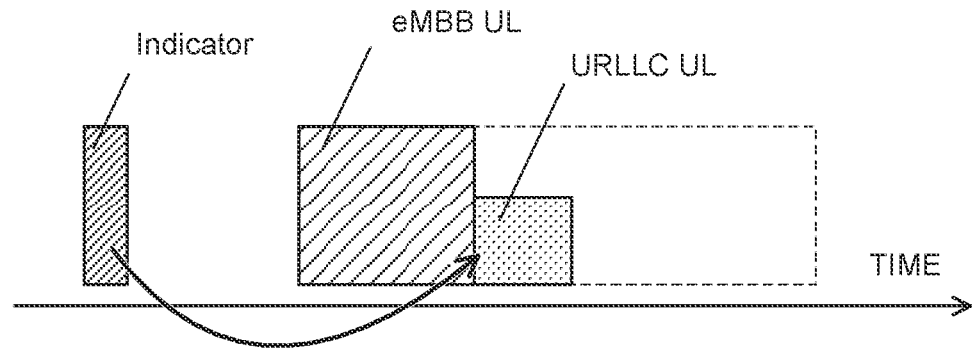
FIGS. 6A, 6B, and 6C illustrate exemplary inter-user terminal (inter-UE) collision processing.

As illustrated in FIG. 6A, in the case of having received the indicator (for example, SFI), the user terminal may drop or cancel the entire scheduled transmission of the PUCCH/PUSCH in eMBB, and then may transmit the PUCCH/PUSCH in URLLC.

Figure 6B:
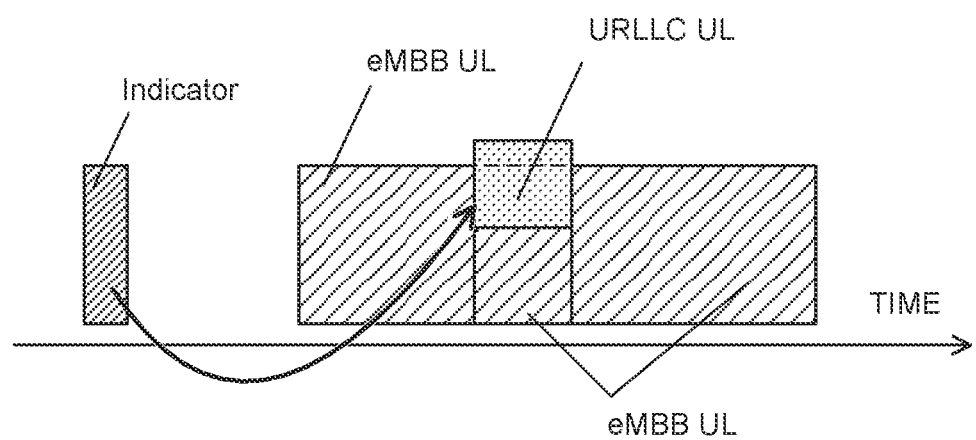

As illustrated in FIG. 6B, in the case of having received the indicator (for example, SFI), the user terminal may drop or cancel part of the scheduled transmission of the PUCCH/PUSCH in eMBB, and then may transmit the PUCCH/PUSCH in URLLC.

In the case of performing retransmission control on a code block group (CBG) basis, the example illustrated in FIG. 6B will be useful. In other cases, the example illustrated in FIG. 6A is sufficient.

In the case of having received the indicator (for example, SFI), the user terminal may delay the scheduled transmission of the PUCCH/PUSCH in eMBB.

Figure 6C:
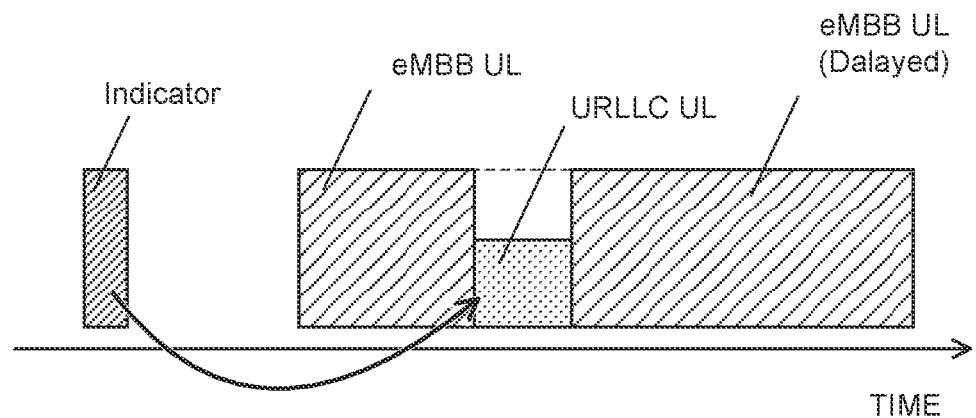

As illustrated in FIG. 6C, in the case of having received the indicator (for example, SFI), the user terminal may delay the scheduled transmission of the PUCCH/PUSCH in eMBB, and then may transmit the PUCCH/PUSCH in URLLC.

FIG. 7 illustrates a signal distribution in a case where the collision processing of the inter-user terminal physical resources is applied.

Figure 7A:
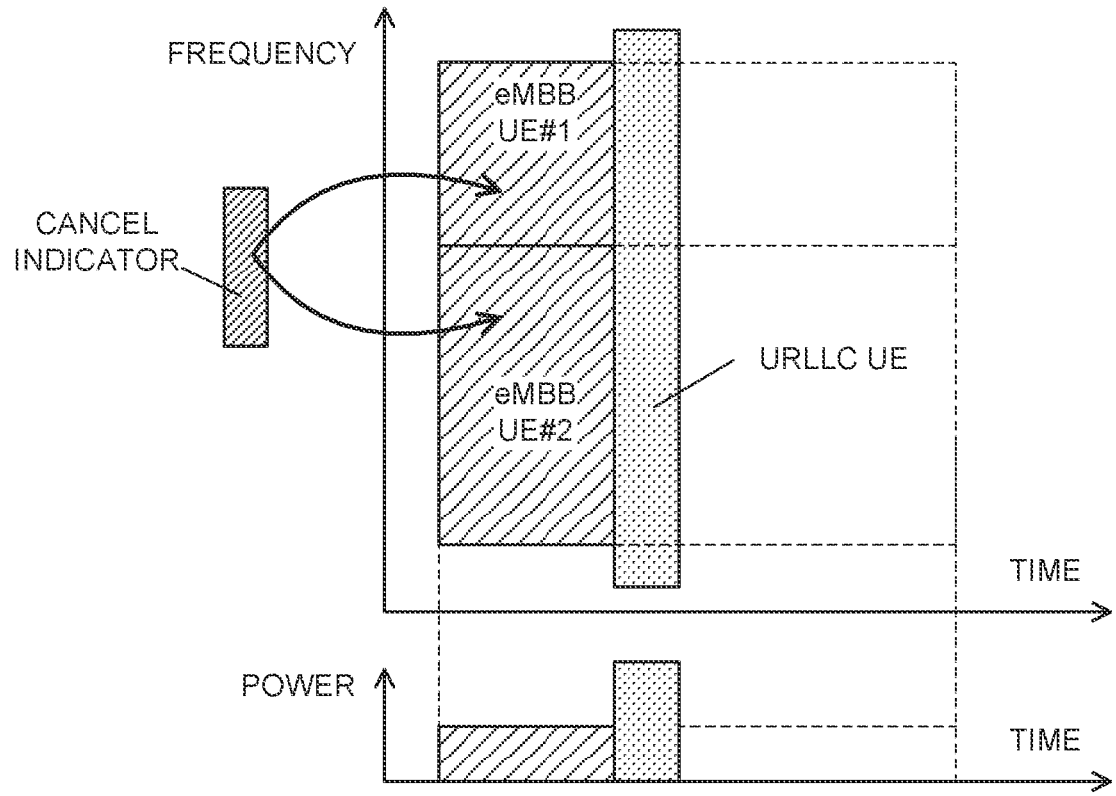
FIGS. 7A and 7B illustrate exemplary inter-user terminal (inter-UE) collision processing.

In FIG. 7A, an inter-UE collision indicator indicates cancelation of the scheduled transmission of the PUCCH/PUSCH in eMBB. The user terminal cancels the transmission of the PUCCH/PUSCH in eMBB, and then transmits the PUCCH/PUSCH in URLLC.

Figure 7B:
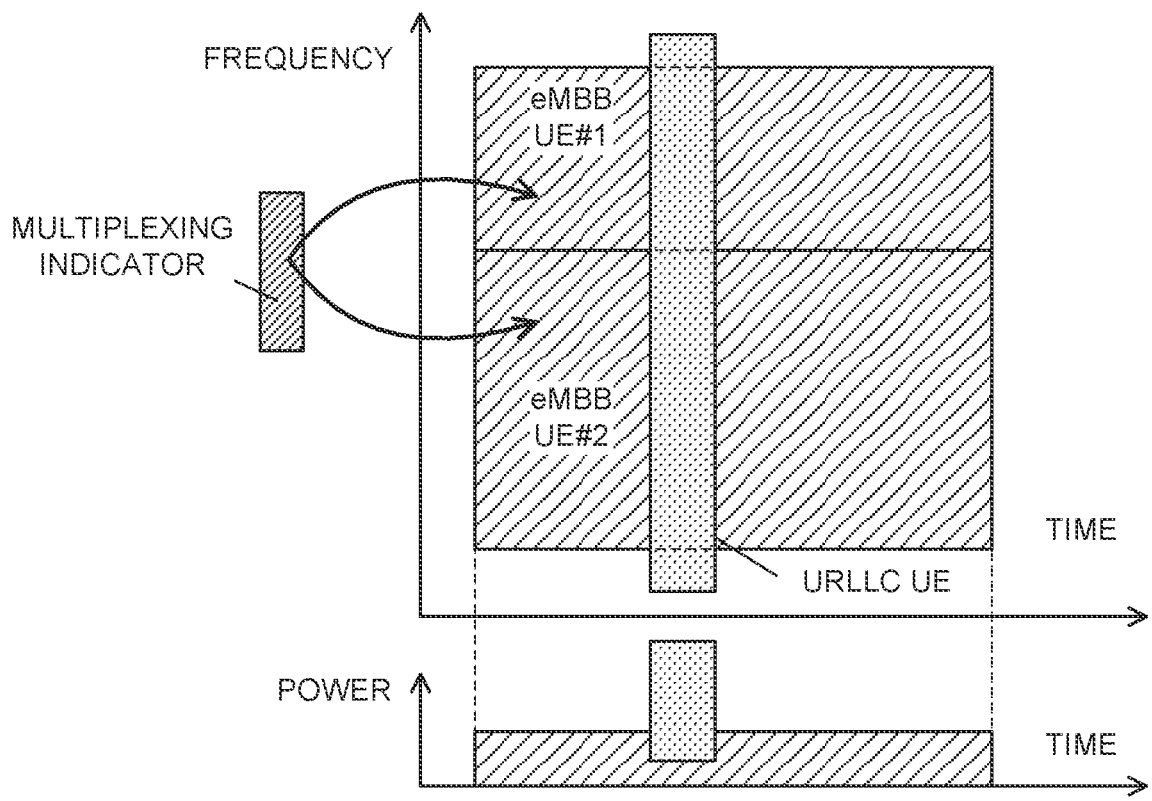

In FIG. 7B, an inter-UE collision indicator indicates multiplexing of the scheduled transmission of the PUCCH/PUSCH in eMBB. The user terminal performs the transmission of the PUCCH/PUSCH in eMBB with the PUCCH/PUSCH in URLLC multiplexed thereon.

(2-2)

Consideration is made in support for multiplexing in a case where the eMBB downlink (DL) of a given user terminal and the URLLC uplink (UL) of a different user terminal collide with each other, that is, when any of the following (1) to (3) is satisfied.

(1) A case where the PUCCH/PUSCH in URLLC triggered by DCI for indicating a new MCS table collides with the PDCCH/PDSCH in eMBB triggered by DCI for indicating an existing MCS table (case where the PUCCH/PUSCH in URLLC triggered by DCI scrambled with a given RNTI collides with the PDCCH/PDSCH in eMBB triggered by DCI scrambled with a C-RNTI (Cell-RNTI) or a CS-RNTI)

(2) A case where the PUCCH/PUSCH in URLLC triggered by the DCI for indicating the new MCS table collides with the PDCCH/PDSCH in eMBB of semi-persistent scheduling (SPS) associated with the existing MCS table (3) A case where the PUCCH/PUSCH in configured grant URLLC associated with the new MCS table collides with the PDCCH/PDSCH in eMBB triggered by the DCI for indicating the existing MCS table.

The user terminal that has been scheduled transmission of the PDSCH in eMBB may expect reception of an inter-UE collision indicator having been transmitted on the basis of a field of new DCI or existing DCI in the common search space.

The user terminal does not attempt to receive canceled part of the PDSCH.

In (2-1) above, in order to transmit an URLLC uplink (UL) signal, part of an eMBB uplink (UL) signal is interrupted (also referred to as preempted, subjected to preemption, or extracted). The drawback in indication of such UL preemption is that UL preemption signaling is required to have high reliability.

The SFI or preemption indication (PI) as an inter-UE collision indicator received by the user terminal has the reliability of eMBB. The reliability of URLLC is required for the UL preemption; however, in (2-1) above, the user terminal in eMBB needs to receive the UL preemption. Even if the UL preemption and the inter-UE collision indicator (for example, SFI or PI) have the same (or a fairly similar) functionality, the UL preemption may differ in design from the indicator.

With a downlink (DL) signal, a base station (for example, gNB) can interrupt transmission. Thus, multiplexing of the eMBB downlink (DL) of a certain user terminal and the URLLC uplink (UL) of a different user terminal can support reliability issues better than multiplexing of the eMBB uplink (UL) of the certain user terminal and the URLLC uplink (UL) of the different user terminal.

The collision processing of the inter-user terminal (inter-UE) physical resources indicated in the second aspect enables appropriate processing of the collision between PUCCH/PUSCH/PDSCH in eMBB and PUCCH/PUSCH in URLLC.

(Radio Communication System)

Hereinafter, the structure of a radio communication system according to the present embodiment will be described. In this radio communication system, a radio communication method according to the above embodiment is applied.

Figure 8:
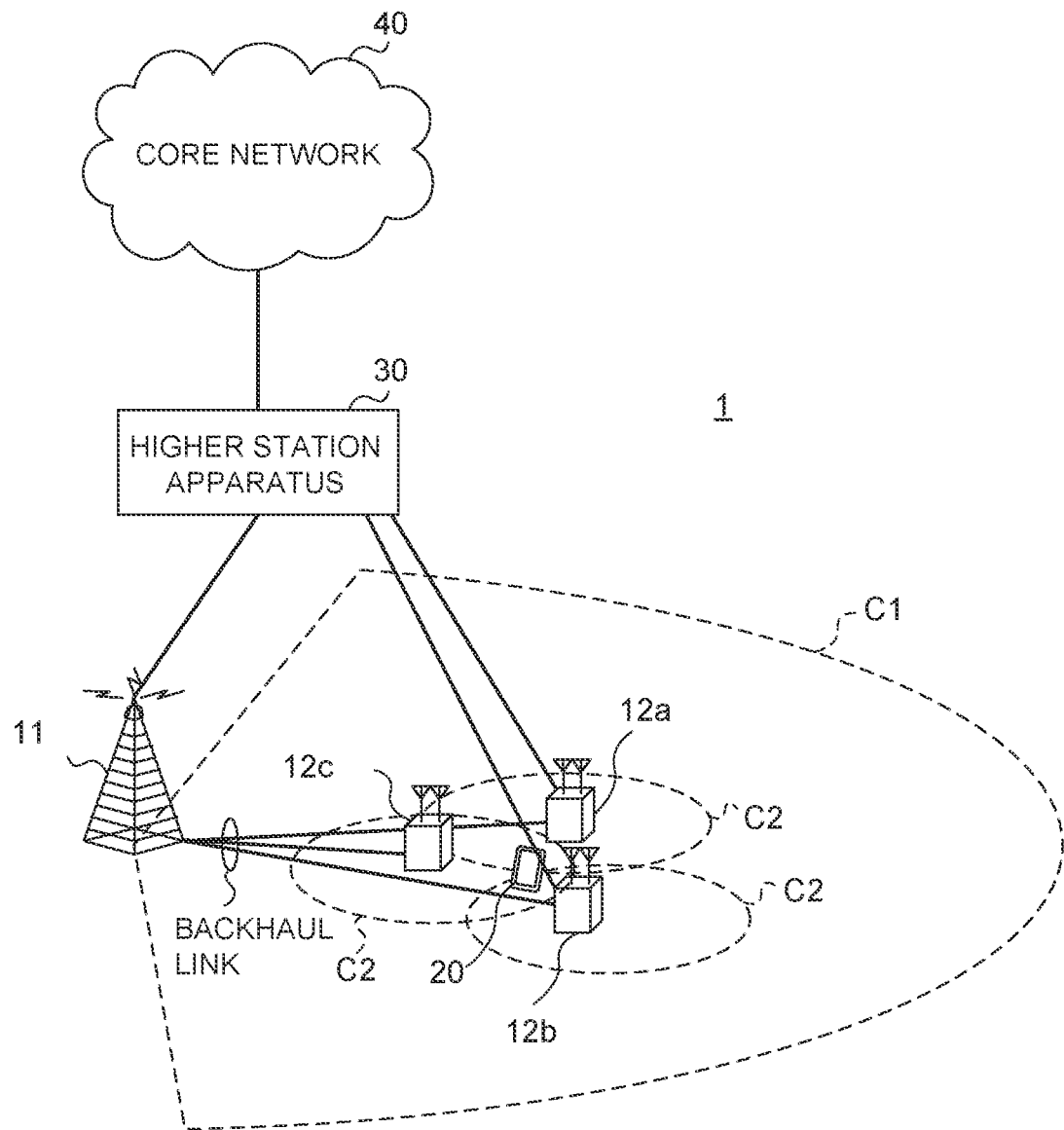
FIG. 8 illustrates an exemplary schematic structure of a radio communication system according to the present embodiment.

FIG. 8 illustrates an exemplary schematic structure of the radio communication system according to the present embodiment. In a radio communication system 1, there can be applied carrier aggregation (CA) or dual connectivity (DC) formed by integration of a plurality of fundamental frequency blocks (component carriers (CCs)) with the system bandwidth (for example, 20 MHz) of the LTE system as one unit. The radio communication system 1 may be referred to as SUPER 3G, (LTE-Advanced (LTE-A), IMT-Advanced, 4G, 5G, future radio access (FRA), new radio (NR), or the like.

The radio communication system 1 may support dual connectivity between a plurality of radio access technologies (RATs) (Multi-RAT DC (MR-DC)). MR-DC may include dual connectivity between LTE and NR in which an LTE (E-UTRA) base station (eNB) serves as a master node and an NR base station (gNB) serves as a secondary node (E-UTRA-NR DC (EN-DC)), and dual connectivity between NR and LTE in which an NR base station (gNB) serves as a master node and an LTE base station (eNB) serves as a secondary node (NR-E-UTRA DC (NE-DC)), and the like.

The radio communication system 1 includes a base station 11 that forms a macro cell C1, and base stations 12a to 12c that are disposed within the macro cell C1 and that each form a small cell C2 narrower than the macro cell C1. A user terminal 20 is disposed in the macro cell C1 and in each small cell C2. There may be adopted a structure in which different numerologies are applied between the cells. Numerology refers to a signal design in a certain RAT or a set of communication parameters that characterize the design of the RAT.

The user terminal 20 can connect to both the base station 11 and a base station 12. It is conceivable that the user terminal 20 simultaneously uses the macro cell C1 and the small cells C2 that use different frequencies by carrier aggregation (CA) or dual connectivity (DC). The user terminal 20 can apply carrier aggregation (CA) or dual connectivity (DC) by using a plurality of cells (CC) (for example, two or more CCs). The user terminal can use a licensed band CC and an unlicensed band CC as the plurality of cells. There can be adopted a structure in which any of the plurality of cells includes a TDD carrier to which a shortened TTI is applied.

Between the user terminal 20 and the base station 11, communication can be performed by use of a carrier with a narrow bandwidth in a relatively low frequency band (for example, 2 GHz) (also referred to as an "existing carrier", a "legacy carrier", or the like). Between the user terminal 20 and a base station 12, a carrier with a wide bandwidth in a relatively high frequency band (for example, 3.5 GHz, 5 GHz, 30 to 70 GHz) may be used, or the same carrier as that for use between the base station 11 and the user terminal 20 may be used. The frequency band for use by each base station is not limited thereto.

There can be adopted a structure in which wired connection (for example, optical fiber compliant with the common public radio interface (CPRI), X2 interface) or radio connection is made between the base station 11 and a base station 12 (or between two base stations 12).

The base station 11 and the base stations 12 are each connected to a higher station apparatus 30, and are connected to a core network 40 via the higher station apparatus 30. The higher station apparatus 30 may include, for example, an access gateway apparatus, a radio network controller (RNC), a mobility management entity (MME), and the like, but is not limited thereto. Each base station 12 may also be connected to the higher station apparatus 30 via the base station 11.

The base station 11 is a base station having a relatively wide coverage, and may be referred to as a macro base station, an aggregate node, an eNB (eNodeB), a transmission/reception point, or the like. Each base station 12 is a base station having a local coverage, and may be referred to as a small base station, a micro base station, a pico base station, a femto base station, a home eNodeB (HeNB), a remote radio head (RRH), a transmission/reception point, or the like. Hereinafter the base stations 11 and 12 will be collectively referred to as a "base station 10," unless distinguished otherwise.

Each user terminal 20 is a terminal that supports various types of communication schemes such as LTE and LTE-A, and may include not only a mobile communication terminal but also a stationary communication terminal.

In the radio communication system 1, as a radio access scheme, orthogonal frequency division multiple access (OFDMA) is applicable to the downlink (DL), and single carrier-frequency division multiple access (SC-FDMA) is applicable to the uplink (UL). OFDMA is a multi-carrier transmission scheme in which a frequency band is divided a plurality of narrow frequency bands (subcarriers) and data is mapped to each subcarrier to perform communication. SC-FDMA is a single-carrier transmission scheme in which a system bandwidth is divided into bands each including one or consecutive resource blocks for each terminal and the plurality of terminals uses the different bands so that inter-terminal interference is reduced. The uplink and downlink radio access schemes are not limited to a combination thereof, and OFDMA may be used in the uplink.

In the radio communication system 1, a downlink data channel (physical downlink shared channel (PDSCH) that is also referred to as a downlink shared channel or the like) shared by the user terminals 20, a broadcast channel (physical broadcast channel (PBCH), L1/L2 control channels, and the like are used as DL channels. User data, higher layer control information, a system information block (SIB), and the like are transmitted by the PDSCH. A master information block (MIB) is transmitted by the PBCH.

The L1/L2 control channels include a downlink control channels (physical downlink control channel (PDCCH), enhanced physical downlink control channel (EPDCCH)), a physical control format indicator channel (PCFICH), a physical hybrid-ARQ indicator channel (PHICH), and the like. Downlink control information (DCI) including scheduling information for the PDSCH and the PUSCH, and the like are transmitted by the PDCCH. The number of OFDM symbols to be used for the PDCCH is transmitted by the PCFICH. Delivery acknowledgment information (ACK/NACK) of an HARQ to the PUSCH is transmitted by the PHICH. The EPDCCH is frequency division multiplexed on the PDSCH (downlink shared data channel) and is used to transmit the DCI and the like similarly to the PDCCH.

In the radio communication system 1, an uplink data channel (physical uplink shared channel (PUSCH) that is also referred to as an uplink shared channel or the like) shared by the user terminals 20, an uplink control channel (physical uplink control channel (PUCCH)), a random access channel (physical random access channel (PRACH)), and the like are used as UL channels. User data and higher layer control information are transmitted by the PUSCH. Uplink control information (UCI) including at least one of delivery acknowledgment information (ACK/NACK) and a channel quality identifier (CQI) is transmitted by the PUSCH or the PUCCH. A random access preamble for establishing connection with cells is transmitted by the PPACH.

<Base Station>

Figure 9:
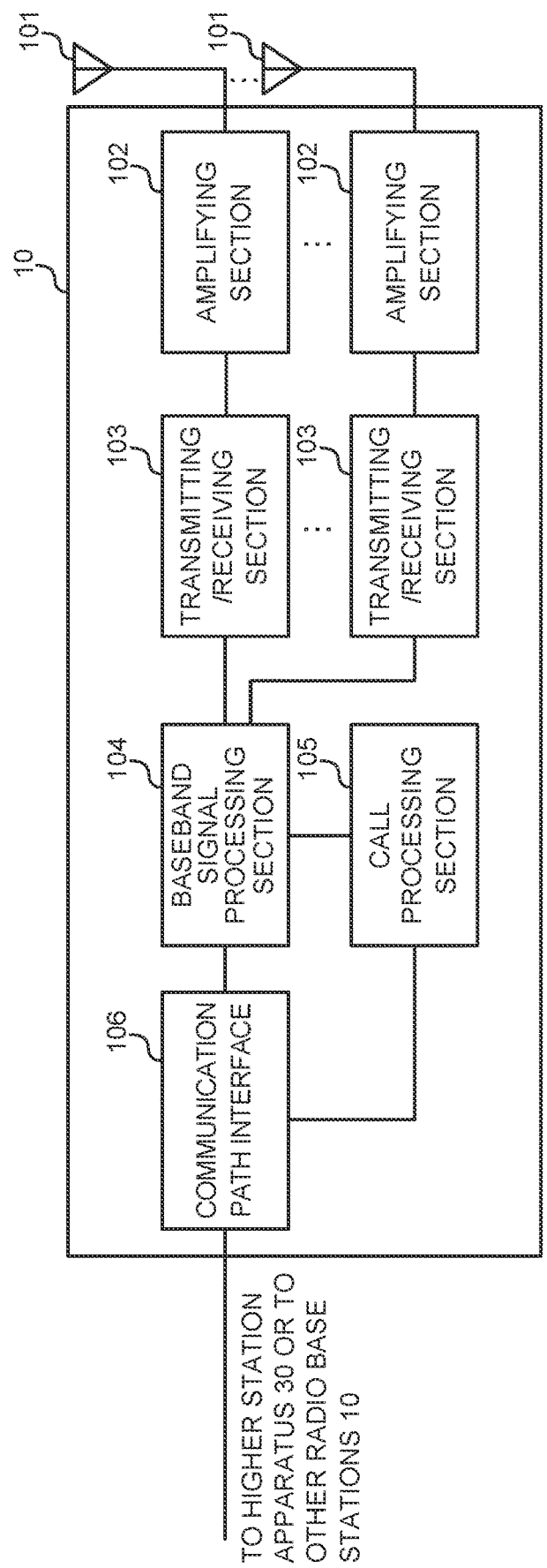
FIG. 9 is a diagram illustrating an exemplary functional structure of a radio base station according to the present embodiment.

FIG. 9 is a diagram illustrating an exemplary overall structure of the radio base station according to the present embodiment. The base station 10 includes a plurality of transmitting/receiving antennas 101, a plurality of amplifying sections 102, a plurality of transmitting/receiving sections 103, a baseband signal processing section 104, a call processing section 105, and a communication path interface 106. It is sufficient if one or more transmitting/receiving antennas 101, one or more amplifying sections 102, and one or more transmitting/receiving sections 103 are included. The base station 10 is a downlink data transmission apparatus, and may be an uplink data reception apparatus.

Downlink data to be transmitted from the base station 10 to a user terminal 20 is input from the higher station apparatus 30 to the baseband signal processing section 104 via the communication path interface 106.

In the baseband signal processing section 104, the downlink data is subjected to transmission processing such as a packet data convergence protocol (PDCP) layer processing, division and coupling of user data, radio link control (RLC) layer transmission processing such as RLC retransmission control, medium access control (MAC) retransmission control (for example, HARQ transmission processing), scheduling, transmission format selecting, channel coding, inverse fast Fourier transform (IFFT) processing, and precoding processing, and then is forwarded to the corresponding transmitting/receiving section 103. A downlink control signal is also subjected to transmission processing such as channel coding and inverse fast Fourier transform, and is forwarded to the transmitting/receiving section 103.

The transmitting/receiving section 103 converts a baseband signal pre-coded for each antenna and output from the baseband signal processing section 104, into a signal in a radio frequency band, and transmits the converted signal. The radio frequency signal subjected to the frequency conversion by the transmitting/receiving section 103 is amplified by the corresponding amplifying section 102, and is transmitted from the corresponding transmitting/receiving antenna 101. As the transmitting/receiving section 103, provided can be a transmitter/receiver, a transmitting/receiving circuit, or a transmitting/receiving apparatus described on the basis of the common recognition in the technical field according to the present invention. The transmitting/receiving section 103 may be provided as an integrated transmitting/receiving section, or may include a transmitting section and a receiving section.

For an uplink signal, the radio frequency signal received by the corresponding transmitting/receiving antenna 101 is amplified by the amplifying section 102. The transmitting/receiving section 103 receives the uplink signal amplified by the amplifying section 102. The transmitting/receiving section 103 frequency-converts the received signal into a baseband signal, and then outputs the baseband signal to the baseband signal processing section 104.

In the baseband signal processing section 104, user data included in the input uplink signal is subjected to fast Fourier transform (FFT) processing, inverse discrete Fourier transform (IDFT) processing, error-correction decoding, MAC retransmission-control reception processing, and RLC layer and PDCP layer reception processing, and then is forwarded to the higher station apparatus 30 via the communication path interface 106. The call processing section 105 performs call processing such as setting or releasing of a communication channel, state management of the base station 10, and management of radio resources.

The communication path interface 106 transmits a signal to and receives a signal from the higher station apparatus 30 via a given interface. The communication path interface 106 may transmit a signal to and receive a signal from a different base station 10 (perform backhaul signaling) via an inter-base station interface (for example, optical fiber compliant with the common public radio interface (CPRI), X2 interface).

The transmitting/receiving section 103 may further include an analog beam forming unit that performs analog beam forming. As the analog beam forming unit, provided can be an analog beam forming circuit (for example, phase shifter, phase shifting circuit) or an analog beam forming apparatus (for example, a phase shifting device) described on the basis of the common recognition in the technical field according to the present invention. As the transmitting/ receiving antenna 101, an array antenna can be provided, for example. The transmitting/receiving section 103 can adopt single BF or multi BF.

The transmitting/receiving section 103 may transmit a signal by using a transmission beam and may receive a signal by using a reception beam. The transmitting/receiving section 103 may transmit and receive a signal by using a given beam determined by a control section 301.

The transmitting/receiving section 103 transmits a downlink signal (for example, downlink control signal (downlink control channel), downlink data signal (downlink data channel, downlink shared channel), downlink reference signal (for example, DM-RS and CSI-RS), discovery signal, synchronization signal, and broadcast signal). The transmitting/receiving section 103 receives an uplink signal (for example, uplink control signal (uplink control channel), uplink data signal (uplink data channel, uplink shared channel), and uplink reference signal).

The transmitting/receiving section 103 may receive an uplink signal or a channel having been transmitted by using at least one of a first MCS table and a second MCS table having a code rate defined lower than the minimum code rate defined in the first MCS table. The transmitting/receiving section 103 may transmit downlink control information including information related to an MCS table.

The transmitting section and the receiving section of the present invention include both or any one of the transmitting/receiving section 103 and the communication path interface 106

Figure 10:
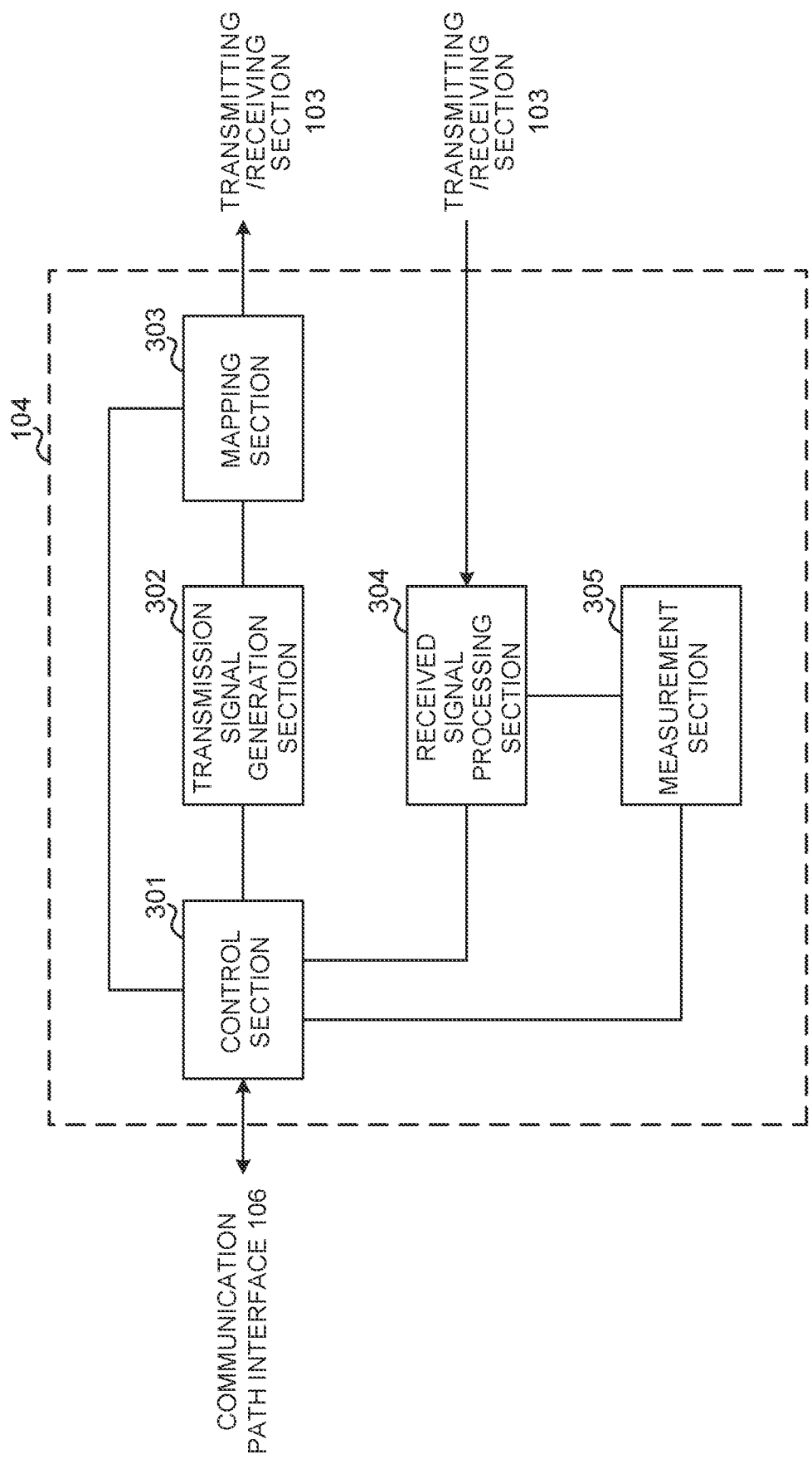
FIG. 10 is a diagram illustrating an exemplary functional structure of a baseband signal processing section of the radio base station.

FIG. 10 is a diagram illustrating an exemplary functional structure of the base station according to the present embodiment. This figure mainly illustrates the functional blocks of characteristic parts of the present embodiment, and it is defined that the base station 10 also has other functional blocks necessary for radio communication. The baseband signal processing section 104 at least includes the control section 301, a transmission signal generation section 302, a mapping section 303, a received signal processing section 304, and a measurement section 305.

The control section 301 performs overall control of the base station 10. As the control section 301, provided can be a controller, a control circuit, or a control apparatus described on the basis of the common recognition in the technical field according to the present invention.

The control section 301 controls, for example, signal generation by the transmission signal generation section 302 and signal allocation by the mapping section 303. The control section 301 controls signal reception processing by the received signal processing section 304 and signal measurement by the measurement section 305.

The control section 301 controls scheduling (for example, resource allocation) for a downlink signal and an uplink signal. Specifically, the control section 301 controls the transmission signal generation section 302, the mapping section 303, and the transmitting/receiving section 103 such that DCI (DL assignment, DL grant) including scheduling information for a downlink data channel and DCI (UL grant) including scheduling information for an uplink data channel are generated and transmitted.

On the basis of an indication from the control section 301, the transmission signal generation section 302 generates a downlink signal (e.g., downlink control channel, downlink data channel, and downlink reference signal such as DM-RS) and outputs the downlink signal to the mapping section 303. As the transmission signal generation section 302, provided can be a signal generator, a signal generation circuit, or a signal generation apparatus described on the basis of the common recognition in the technical field according to the present invention.

On the basis of an indication from the control section 301, the mapping section 303 maps the downlink signal generated by the transmission signal generation section 302 to a given radio resource, and then outputs the result to the transmitting/receiving section 103. As the mapping section 303, provided can be a mapper, a mapping circuit, or a mapping apparatus described on the basis of the common recognition in the technical field according to the present invention.

The received signal processing section 304 performs reception processing (for example, demapping, demodulating, and decoding) on the received signal input from the transmitting/receiving section 103. For example, the received signal is an uplink signal (e.g., uplink control channel, uplink data channel, and uplink reference signal) transmitted from the user terminal 20. As the received signal processing section 304, provided can be a signal processor, a signal processing circuit, or a signal processing apparatus described on the basis of the common recognition in the technical field according to the present invention.

The received signal processing section 304 outputs the information decoded by the reception processing to the control section 301. For example, the reception processing section 304 outputs at least one of a preamble, control information, and UL data to the control section 301. Furthermore, the received signal processing section 304 outputs the received signal and the signal after the reception processing to the measurement section 305.

The measurement section 305 performs measurement for the received signals. As the measurement section 305, provided can be a measurer, a measurement circuit, or a measurement apparatus described on the basis of the common recognition in the technical field according to the present invention.

The measurement section 305 may measure, for example, the received power (for example, reference signal received power (RSRP)), received quality (for example, reference signal received quality (RSRQ), and channel state of each received signal. The measurement results may be output to the control section 301.

<User Terminal>

Figure 11:
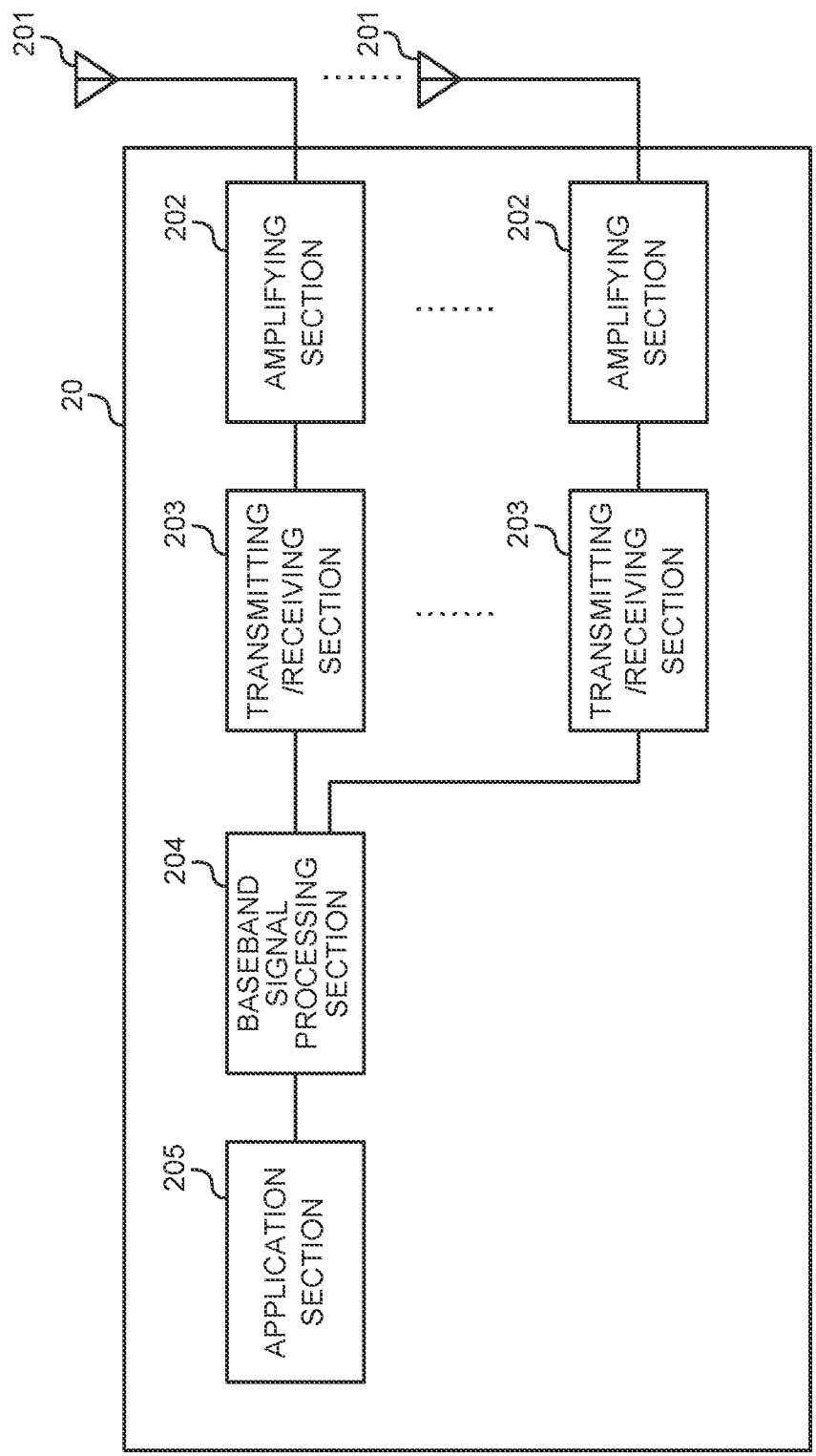
FIG. 11 is a diagram illustrating an exemplary functional structure of a user terminal according to the present embodiment.

FIG. 11 is a diagram illustrating an exemplary overall structure of the user terminal according to the present embodiment. The user terminal 20 includes a plurality of transmitting/receiving antennas 201, a plurality of amplifying sections 202, a plurality of transmitting/receiving sections 203, a baseband signal processing section 204, and an application section 205. It is sufficient if one or more transmitting/receiving antennas 201, one or more amplifying sections 202, and one or more transmitting/receiving sections 203 are included. The user terminal 20 is a downlink data reception apparatus, and may be an uplink data transmission apparatus.

A radio frequency signal received by each transmitting/receiving antennas 201 is amplified by the corresponding amplifying section 202. The corresponding transmitting/receiving section 203 receives a downlink signal amplified by the amplifying section 202. The transmitting/receiving section 203 frequency-converts the received signal into a baseband signal, and then outputs the baseband signal to the baseband signal processing section 204. As the transmitting/receiving section 203, provided can be a transmitter/receiver, a transmitting/receiving circuit, or a transmitting/receiving apparatus described on the basis of the common recognition in the technical field according to the present invention. The transmitting/receiving section 203 may be provided as an integrated transmitting/receiving section, or may include a transmitting section and a receiving section.

The baseband signal processing section 204 performs FFT processing, error-correction decoding, retransmission-control reception processing, and the like on the input baseband signal. Downlink data is forwarded to the application section 205. The application section 205 performs, for example, processing related to a layer higher than a physical layer and an MAC layer. System information and higher layer control information in the downlink data are also forwarded to the application section 205.

Uplink user data is input from the application section 205 to the baseband signal processing section 204. In the baseband signal processing section 204, the input uplink user data is subjected to retransmission-control transmission processing (for example, HARQ transmission processing), channel coding, precoding, discrete Fourier transform (DFT) processing, IFFT processing, and the like, and then is forwarded to the transmitting/receiving section 203. The transmitting/receiving section 203 converts the baseband signal output from the baseband signal processing section 204 into a signal in a radio frequency band, and transmits the converted signal. The radio frequency signal subjected to the frequency conversion by the transmitting/receiving section 203 is amplified by the corresponding amplifying section 202, and is transmitted from the transmitting/receiving antenna 201.

The transmitting/receiving section 203 may further include an analog beam forming unit that performs analog beam forming. As the analog beam forming unit, provided can be an analog beam forming circuit (for example, phase shifter, phase shifting circuit) or an analog beam forming apparatus (for example, a phase shifting device) described on the basis of the common recognition in the technical field according to the present invention. As the transmitting/receiving antenna 201, an array antenna can be provided, for example. The transmitting/receiving section 203 can adopt single BF or multi BF.

The transmitting/receiving section 203 may transmit a signal by using a transmission beam and may receive a signal by using a reception beam. The transmitting/receiving section 203 may transmit and receive a signal by using a given beam determined by a control section 401.

The transmitting/receiving section 203 receives a downlink signal (for example, downlink control signal (downlink control channel), downlink data signal (downlink data channel, downlink shared channel), downlink reference signal (e.g., DM-RS and CSI-RS), discovery signal, synchronization signal, and broadcast signal). The transmitting/receiving section 203 transmits an uplink signal (for example, uplink control signal (uplink control channel), uplink data signal (uplink data channel, uplink shared channel), and uplink reference signal).

The transmitting/receiving section 203 may perform uplink transmission or downlink reception by using at least one of a first MCS table and a second MCS table having a code rate defined lower than the minimum code rate defined in the first MCS table.

Figure 12:
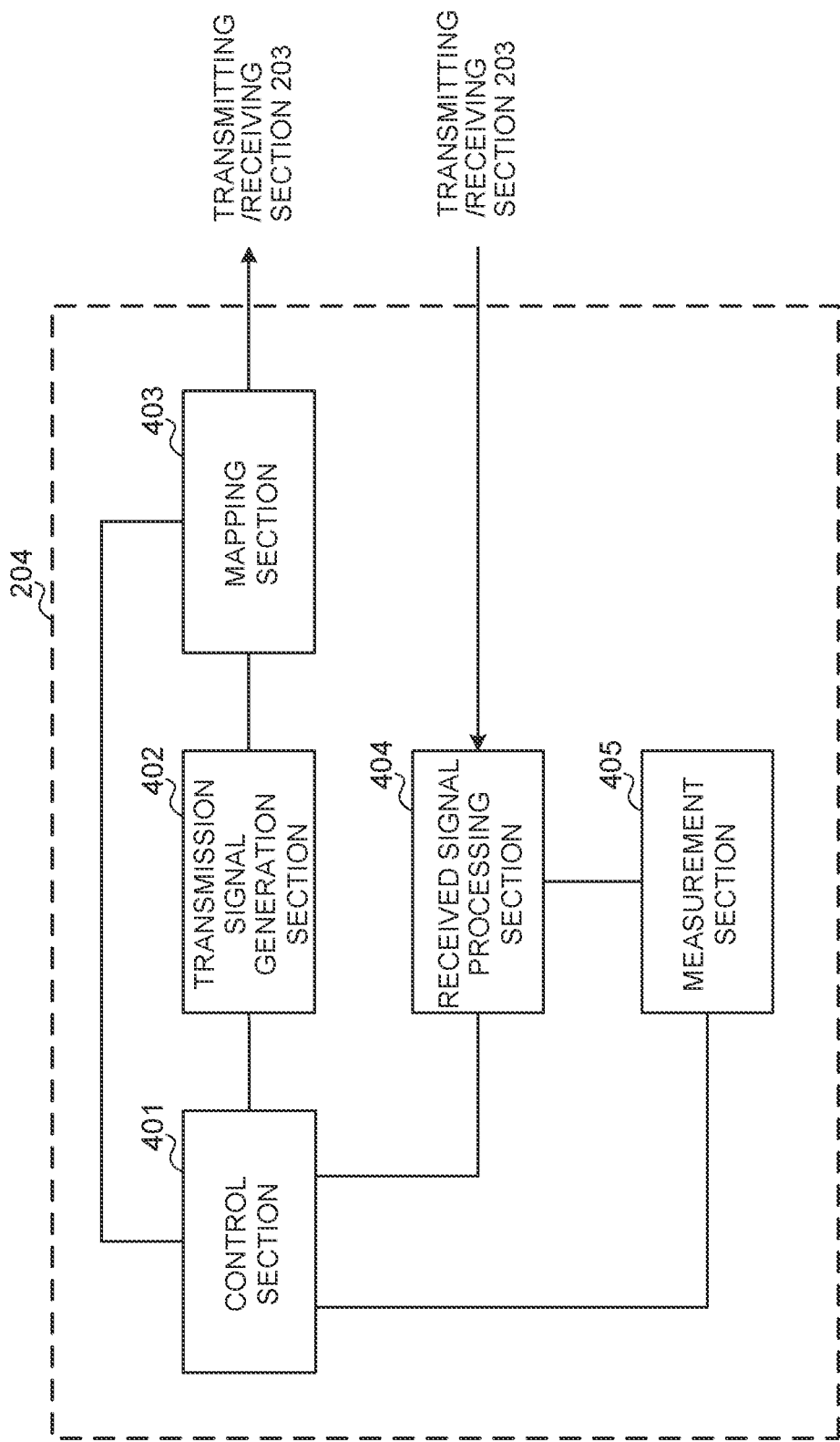
FIG. 12 is a diagram illustrating an exemplary functional structure of a baseband signal processing section of a user terminal.

FIG. 12 is a diagram illustrating an exemplary functional structure of the user terminal according to the present embodiment. This figure mainly illustrates the functional blocks of characteristic parts in the present embodiment, and it is defined that the user terminal 20 also has other functional blocks necessary for radio communication. The baseband signal processing section 204 included in the user terminal 20 at least includes the control section 401, a transmission signal generation section 402, a mapping section 403, a received signal processing section 404, and a measurement section 405.

The control section 401 performs overall control of the user terminal 20. As the control section 401, provided can be a controller, a control circuit, or a control apparatus described on the basis of common recognition in the technical field according to the present invention.

The control section 401 controls, for example, signal generation by the transmission signal generation section 402 and signal allocation by the mapping section 403. The control section 401 controls signal reception processing by the received signal processing section 404 and signal measurement by the measurement section 405.

The control section 401 may control collision processing in a case where uplink transmission with a first MCS table and uplink transmission with a second MCS table collide with each other.

The control section 401 may drop uplink transmission with the first MCS table before or after multiplexing uplink control information or an uplink shared channel on the resource. The control section 401 may perform control such that the uplink control information of the uplink transmission with the first MCS table is transmitted by use of the uplink transmission with the second MCS table.

The control section 401 may transmit a delivery acknowledgement signal or a scheduling request for the uplink transmission with the first MCS table by using the uplink transmission with the second MCS table, and may drop channel state information.

After multiplexing the uplink control information or the uplink shared channel on the resource, the control section 401 may puncture the uplink transmission with the second MCS table on the uplink transmission with the first MCS table.

The control section 401 may drop the uplink transmission with the first MCS table before or after multiplexing the uplink control information or the uplink shared channel on the resource.

On the basis on an indication from the control section 401, the transmission signal generation section 402 generates an uplink signal (e.g., uplink control channel, uplink data channel, and uplink reference signal) and outputs the uplink signal to the mapping section 403. As the transmission signal generation section 402, provided can be a signal generator, a signal generation circuit, or a signal generation apparatus described on the basis of the common recognition in the technical field according to the present invention.

The transmission signal generation section 402 generates an uplink data channel on the basis of an indication from the control section 401. For example, when a UL grant is included in a downlink control channel notified from the base station 10, the control section 401 indicates the transmission signal generation section 402 to generate an uplink data channel.

On the basis of an indication from the control section 401, the mapping section 403 maps an uplink signal generated by the transmission signal generation section 402 to a radio resource and outputs the result to the transmitting/receiving section 203. As the mapping section 403, provided can be a mapper, a mapping circuit, or a mapping apparatus described on the basis of the common recognition in the technical field according to the present invention.

The received signal processing section 404 performs reception processing (for example, demapping, demodulating, and decoding) on the received signal input from the transmitting/receiving section 203. For example, the received signal is a downlink signal (e.g., downlink control channel, downlink data channel, and downlink reference signal) transmitted from the base station 10. As the received signal processing section 404, provided can be a signal processor, a signal processing circuit, or a signal processing apparatus described on the basis of the common recognition in the technical field according to the present invention. The received signal processing section 404 can be provided as a receiving section according to the present invention.

On the basis of an indication from the control section 401, the received signal processing section 404 blind-decodes the downlink control channel that schedules transmission and reception of the downlink data channel and then performs reception processing of the downlink data channel on the basis of the DCI. The received signal processing section 404 estimates a channel gain on the basis of DM-RS or CRS, and then demodulates the downlink data channel on the basis of the estimated channel gain.

The received signal processing section 404 outputs the information decoded by the reception processing to the control section 401. The received signal processing section 404 outputs, for example, broadcast information, system information, RRC signaling, and DCI, to the control section 401. The received signal processing section 404 may output the decoding result of data to the control section 401. The received signal processing section 404 outputs the received signal and the signal after the reception processing to the measurement section 405.

The measurement section 405 performs measurement for the received signals. As the measurement section 405, provided can be a measurer, a measurement circuit, or a measurement apparatus described on the basis of the common recognition in the technical field according to the present invention.

The measurement section 405 may measure, for example, the received power (for example, RSRP), DL reception quality (for example, RSRQ), and channel state of each received signal. The measurement results may be output to the control section 401.

(Hardware Structure)

The block diagrams that have been used to describe the above embodiment illustrate blocks on a function basis. These functional blocks (constituent units) may be achieved by any combination of at least either pieces of hardware or pieces of software. The method of achieving each functional block is not particularly limited. That is, each functional block may be achieved by use of one apparatus physically or logically aggregated, or may be achieved by connecting (by use of, for example, wires or radio) directly or indirectly two or more apparatuses physically or logically separated and by use of these two or more apparatuses. Each functional block may be achieved by combining the above one apparatus or the above two or more apparatuses with software.

Here, the functions include, but are not limited to, determining, judging, calculating, computing, processing, deriving, investigating, looking up, search, inquiry, ascertaining, receiving, transmitting, outputting, accessing, solving, selecting, choosing, establishing, comparing, assuming, expecting, deeming, broadcasting, notifying, communicating, forwarding, configuring, reconfiguring, allocating, mapping, and assigning. For example, a functional block (constituent unit) that makes a transmission function may be referred to as a transmitting section or a transmitter. In any case, as described above, the achieving method is not particularly limited.

Figure 13:
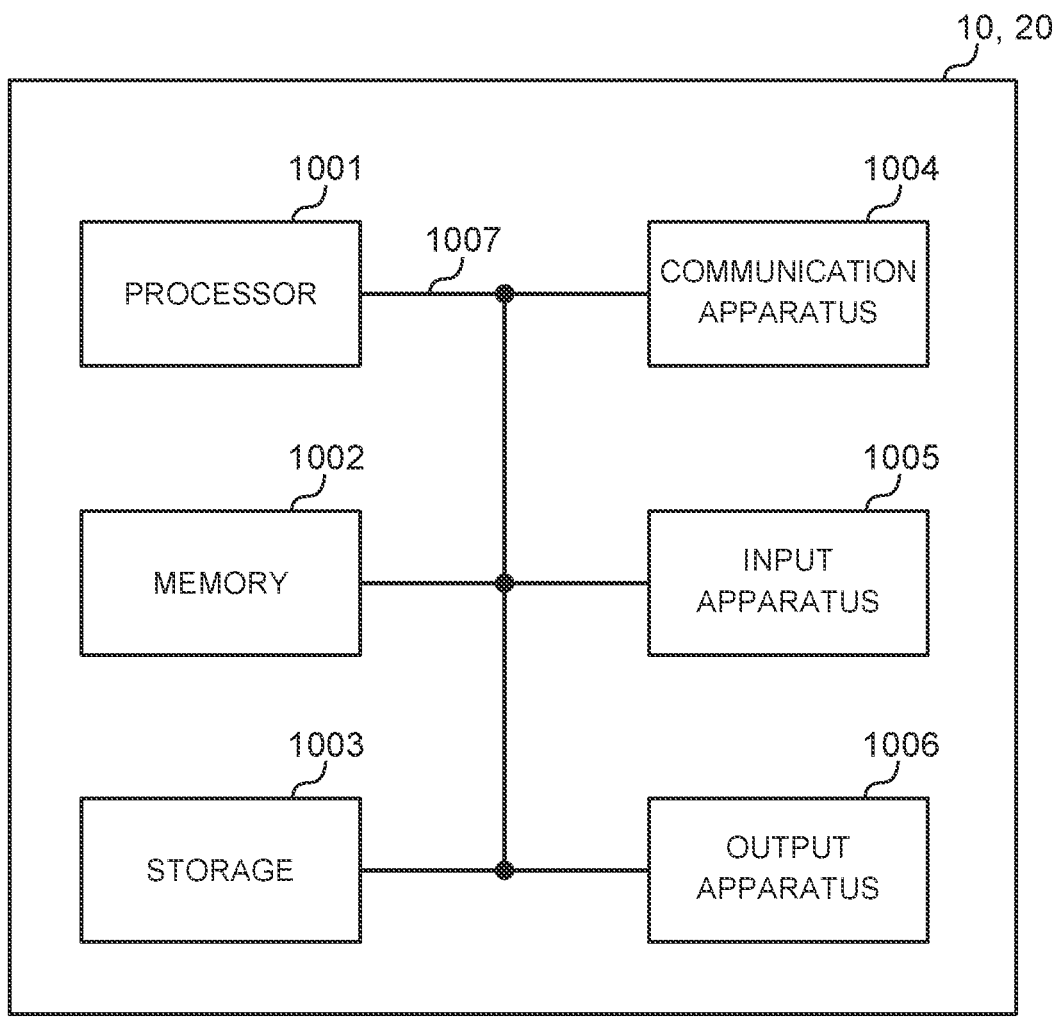
FIG. 13 is a diagram illustrating an exemplary hardware structure of the radio base station and the user terminal according to one embodiment of the present invention.

For example, each base station, each user terminal, and the like according to the one embodiment of the present disclosure may function as a computer that executes processing of the radio communication method of the present disclosure. FIG. 13 is a diagram illustrating an exemplary hardware structure of the base station and the user terminal according to the one embodiment. The above base station 10 and the user terminal 20 each may be physically provided as a computer apparatus that includes a processor 1001, a memory 1002, a storage 1003, a communication apparatus 1004, an input apparatus 1005, an output apparatus 1006, and a bus 1007.

In the present disclosure, the terms such as apparatus, circuit, device, section, and unit can be read interchangeably. The respective hardware structures of the base station 10 and the user terminal 20 may be designed to include one or more of the apparatuses each illustrated in the drawings, or may be designed without including part of the apparatuses.

For example, only one processor 1001 is illustrated; however, a plurality of processors may be provided. Processing may be executed by one processor, or processing may be executed simultaneously, sequentially, or in a different manner, by two or more processors. The processor 1001 may be implemented with at least one chip.

Each function of the base station 10 and the user terminal 20 is achieved by reading given software (a program) on hardware such as the processor 1001 or the memory 1002, by the processor 1001 performing arithmetic operation, controlling communication via the communication apparatus 1004, and controlling at least one of data reading and data writing in the memory 1002 and the storage 1003, for example.

The processor 1001 controls the entire computer by running an operating system, for example. As the processor 1001, provided may be a central processing unit (CPU) including an interface with peripheral equipment, a control device, an arithmetic device, a register, and the like. For example, the above baseband signal processing section 104 (204), call processing section 105, and the like may be achieved by the processor 1001.

The processor 1001 reads a program (program code), a software module, data, and the like from at least one of the storage 1003 and the communication apparatus 1004, into the memory 1002, and then executes various types of processing in accordance with the read program (program code), software module, data, and the like. As for the program, a program that makes the computer execute at least part of the operations described in the above embodiment may be used. For example, the control section 401 of the user terminal 20 may be achieved by a control program that is stored in the memory 1002 and that operates on the processor 1001, and other functional blocks may be achieved similarly.

The memory 1002 is a computer-readable recording medium, and may include, for example, at least one of a read only memory (ROM), an (erasable programmable ROM (EPROM), an electrically EPROM (EEPROM), a random access memory (RAM), and a different appropriate storage medium. The memory 1002 may be referred to as a "register", a "cache", a "main memory (primary storage device)", or the like. The memory 1002 can store a program (program code), a software module, and the like that are executable for achieving the radio communication method according to the one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM), a digital versatile disc, and a Blu-ray (registered trademark) disk), a removable disk, a hard disk drive, a smart card, a flash memory device (for example, a card, a stick, and a key drive), a magnetic stripe, a data base, a server, and a different appropriate storage medium. The storage 1003 may be referred to as an "auxiliary storage device".

The communication apparatus 1004 is hardware (transmitting/receiving device) for performing inter-computer communication via at least one of a wired network and a radio network, and is also referred to as, for example, a "network device", a "network controller", a "network card", or a "communication module". In order to achieve, for example, at least one of frequency division duplex (FDD) and time division duplex (TDD), the communication apparatus 1004 may include a high frequency switch, a duplexer, a filter, a frequency synthesizer, and the like. For example, the above transmitting/receiving antennas 101 (201), amplifying sections 102 (202), transmitting/receiving sections 103 (203), communication path interface 106, and the like may be achieved by the communication apparatus 1004. The transmitting/receiving sections 103 (203) each may be implemented so as to be physically or logically separated into a transmitting section 103a (203a) and a receiving section 103b (203b).

The input apparatus 1005 is an input apparatus (for example, a keyboard, a mouse, a microphone, a switch, a button, or a sensor) that receives input from the outside. The output apparatus 1006 is an output apparatus (for example, a display, a speaker, or a light emitting diode (LED) lamp) that performs output to the outside. The input apparatus 1005 and the output apparatus 1006 may be integrally provided (for example, a touch panel).

These devices such as the processor 1001, the memory 1002, and the like are each connected by the bus 1007 for communicating information. The bus 1007 may be a single bus, or may include buses different between the devices.

The base station 10 and the user terminal 20 each may include hardware such as a microprocessor, a digital signal processor (DSP), an application specific integrated circuit (ASIC), a programmable logic device (PLD), or a field programmable gate array (FPGA), and part or all of each functional block may be achieved by the hardware. For example, the processor 1001 may be implemented with at least one of these pieces of hardware.

(Modifications)

The terms described in the present disclosure and the terms that are needed to understand the present disclosure may be replaced with other terms that convey the same or similar meanings. For example, a channel, a symbol, and a signal (signal or signaling) may be read interchangeably. A "signal" may be a "message". A reference signal may be abbreviated as an "RS," and may be referred to as a "pilot," a "pilot signal", or the like, depending on which standard is adopted. A "component carrier (CC)" may be referred to as a "cell", a "frequency carrier", a "carrier frequency", or the like.

A radio frame may include one or more time periods (frames) in a time domain. Each of the one or more time periods (frames) included in the radio frame may be referred to as a "subframe". Furthermore, the subframe may include one or more slots in the time domain. The subframe may be a numerology-independent fixed time duration (for example, 1 ms).

Here, numerology may be a communication parameter to be adopted for at least one of transmission and reception of a certain signal or channel. For example, such a numerology may indicate at least one of subcarrier spacing (SCS), a bandwidth, a symbol length, a cyclic prefix length, a transmission time interval (TTI), the number of symbols per TTI, a radio frame structure, specific filtering processing to be performed by a transceiver in a frequency domain, specific windowing processing to be performed by the transceiver in a time domain, and the like.

A slot may include, in the time domain, one or more symbols such as an orthogonal frequency division multiplexing (OFDM) symbol and a single carrier frequency division multiple access (SC-FDMA) symbol. The slot may be a numerology-based time unit.

The slot may include a plurality of minislots. Each minislot includes one or more symbols in the time domain. The minislot may be referred to as a "subslot". The minislot may include fewer symbols than the slot. A PDSCH (or PUSCH) transmitted in a time unit larger than the minislot may be referred to as PDSCH (PUSCH) mapping type A. A PDSCH (or PUSCH) transmitted by use of the minislot may be referred to as "PDSCH (PUSCH) mapping type B".

The radio frame, subframe, slot, minislot, and symbol all represent a time unit in signal transmission. The radio frame, subframe, slot, minislot, and symbol may be each called by a different applicable name.

For example, one subframe may be referred to as a "transmission time interval (TTI)", a plurality of consecutive subframes may be referred to as a "TTI", or one slot or one minislot may be referred to as a "TTI". That is, at least one of the subframe and the TTI may be a subframe (1 ms) in the existing LTE, may be a shorter time period than 1 ms (for example, 1 to 13 symbols), or may be a longer time period than 1 ms. The unit representing a TTI may be referred to as the "slot", the minislot", or the like, instead of the "subframe".

Here, the TTI refers to the minimum time unit of scheduling in radio communication. For example, in the LTE systems, a base station schedules radio resources (for example, frequency bandwidth and transmit power that can be used in each user terminal) to allocate the radio resources to each user terminal on a TTI basis. The definition of the TTI is not limited to the above definition.

The TTI may be a transmission time unit such as a channel-coded data packet (transport block), a code block, a codeword, or the like, or may be a processing unit such as scheduling or link adaptation. When the TTI is given, a time interval (for example, the number of symbols) in which the transport block, the code block, the codeword, or the like is practically mapped may be shorter than the TTI.

When one slot or one minislot is referred to as a "TTI", at least one TTI (that is, one or more slots or one or more minislots) may be the minimum time unit of scheduling. The number of slots (the number of minislots) included in the minimum time unit of the scheduling may be controlled.

A TTI having a time duration of 1 ms may be referred to as a normal TTI (TTI in LTE Rel. 8-12), a normal TTI, a long TTI, a normal subframe, a normal subframe, a long subframe, a slot, or the like. A TTI shorter than the normal TTI may be referred to as a shortened TTI, a short TTI, a partial TTI (partial or fractional TTI), a shortened subframe, a short subframe, a minislot, a subslot, a slot, or the like.

A long TTI (for example, normal TTI or subframe) may be read as a TTI having a time duration over 1 ms, and a short TTI (for example, shortened TTI) may be read as a TTI having a TTI length shorter than that of the long TTI and equal to or longer than 1 ms.

A resource block (RB) is the unit of resource allocation in a time domain and a frequency domain, and may include one or more consecutive subcarriers in the frequency domain.

The resource block (RB) may include one or more symbols in a time domain, and may be one slot, one minislot, one subframe, or one TTI in length. One TTI and one subframe each may include one or more resource blocks.

One or more resource blocks (RBs) may be referred to as a "physical resource block (physical RB (PRB))", a "subcarrier group (SCG)", a "resource element group (REG)", a "PRB pair", an "RB pair", or the like.

A resource block may include one or more resource elements (REs). For example, one RE may be a radio resource domain of one subcarrier and one symbol.

The structures of the above radio frame, subframe, slot, minislot, symbol, and the like are merely examples. For example, the structures such as the number of subframes included in a radio frame, the number of slots per subframe or radio frame, the number of minislots included in a slot, the number of symbols and resource blocks (RBs) included in a slot or a minislot, the number of subcarriers included in a resource block (RB), and the number of symbols, a symbol length, a cyclic prefix (CP) length in a TTI can be changed variously.

The information, parameters, and the like described in the present disclosure may be represented with absolute values, may be represented with relative values with respect to given values, or may be represented with other applicable information. For example, a radio resource may be indicated by a given index.

The names used for the parameters and the like in the present disclosure are not limited in any respect. Furthermore, any mathematical expression or the like that uses these parameters may differ from those explicitly disclosed in the present disclosure. Various channels, for example, a physical uplink control channel (PUCCH) and a physical downlink control channel (PDCCH), and information elements can be identified by any suitable names, and thus the various names assigned to these various channels and information elements are not limited in any respect.

The information, signals, and the like described in the present disclosure may be represented by use of various different technologies. For example, data, commands, commands, information, signals, bits, symbols, and chips, all of which may be referenced entirely throughout the above description, may be represented by voltages, currents, electromagnetic waves, magnetic fields or magnetic particles, optical fields or photons, or any combination thereof.

Information, signals, and the like can be output at least from a higher layer to a lower layer or from a lower layer to a higher layer. Information, signals, and the like may be input or output via a plurality of network nodes.

Information, signals, and the like input or output may be stored in a specific location (for example, memory), or may be managed with a management table. Information, signals, and the like to be input or output can be overwritten, updated, or appended. Information, signals, and the like output may be deleted. Information, signals, and the like input may be transmitted to a different apparatus.

Notifying of information is not limited to the aspects/ embodiment described in the present disclosure, and may be performed by use of a different method. For example, notifying of information may be achieved by use of physical layer signaling (for example, downlink control information (DCI), uplink control information (UCI)), higher layer signaling (for example, radio resource control (RRC) signaling, broadcast information (master information block (MIB)), a system information block (e.g., system information block (SIB)), and medium access control (MAC) signaling), other signals, or a combination thereof.

The physical layer signaling may be referred to as "Layer 1/Layer 2 (L1/L2) control information (L1/L2 control signals)", "L1 control information (L1 control signal)", or the like. The RRC signaling may be referred to as an "RRC message", and may be, for example, an RRC connection setup message, an RRC connection reconfiguration message, or the like. Notification of the MAC signaling may be given by use of, for example, an MAC control element (MAC CE).

Notification of given information (for example, notification of information about the effect that "X holds") does not necessarily have to be given explicitly, and can be sent implicitly (for example, by not notifying the given information or by notifying another piece of information).

Judging may be made in values represented by one bit (0 or 1), may be made in Boolean values represented by true or false, or may be made by comparing numerical values (for example, comparing with a given value).

Software, whether referred to as software, firmware, middleware, a microcode, or a hardware description language, or called by other names, should be interpreted broadly to mean a command, a command set, a code, a code segment, a program code, a program, a subprogram, a software module, an application, a software application, a software package, a routine, a subroutine, an object, an executable file, an execution thread, a procedure, a function, and the like.

Software, commands, information, and the like may be transmitted and received via a transmission medium. For example, in a case where software is transmitted from a website, a server, or a different remote source by use of at least one of a wired technology (for example, coaxial cable, optical fiber cable, twisted-pair cable, and digital subscriber line (DSL)) and a radio technology (for example, infrared ray and microwave), at least one of the wired technology and the radio technology is included in the definition of the transmission medium.

The terms "system" and "network" as used in the present disclosure can be used interchangeably.

In the present disclosure, the terms such as "precoding", "precoder", "weight (precoding weight)", "quasi-co-location (QCL)", "transmission configuration indication (TCI) state", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", and "antenna element", "panel" can be used interchangeably.

In the present disclosure, the terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)" can be used interchangeably. The base station may be called with a term such as macro cell, small cell, femto cell, and pico cell in some cases.

The base station can accommodate one or more (for example, three) cells (also referred to as "sectors"). In a case where the base station accommodates a plurality of cells, the entire coverage area of the base station can be partitioned into a plurality of smaller areas, and each smaller area can provide communication services through a base station subsystem (for example, small remote radio head (RRH) for indoors. The term "cell" or "sector" refers to part or entirety of the coverage area of at least one of a base station and a base station subsystem that provide communication services within this coverage.

In the present disclosure, the terms such as mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or may be called with some other suitable terms.

At least one of the base station and the mobile station may be referred to as a transmission apparatus, a reception apparatus, a communication apparatus or the like. At least one of the base station and the mobile station may be a device mounted on a movable object, a movable object itself, or the like. The movable object may be a vehicle (for example, automobile and airplane), an unmanned movable object (for example, drone and autonomous vehicle), or a robot (manned or unmanned). At least one of the base station and the mobile station also includes a device that does not necessarily move during a communication operation. For example, at least one of the base station and the mobile station may be an Internet of Things (IoT) device, such as a sensor.

The base station in the present disclosure may be read as a user terminal. For example, each aspect/embodiment of the present disclosure may be applied to a structure in which communication between a base station and a user terminal is replaced with communication among a plurality of user terminals (that may also be referred to as, for example, Device-to-Device (D2D), or Vehicle-to-Everything (V2X). In this case, the user terminal 20 may have the functions of the above base station 10. The wording such as "uplink" and "downlink" may be read as the wording corresponding to the inter-terminal communication (for example, "side"). For example, an uplink channel and a downlink channel may be read as a side channel.

Similarly, the user terminal in the present disclosure may be read as the base station. In this case, the base station 10 may have the functions of the above user terminal 20.

The operations that have been described in the present disclosure to be performed by the base station may be performed by its upper node, in some cases. In a network including one or more network nodes with a base station, it is obvious that various operations performed for communication with a terminal can be performed by the base station, one or more network nodes other than the base station (for example, mobility management entities (MMEs) and serving-gateways (S-GWs) and the like may be considerable, but these are not limiting), or a combination thereof.

Each aspect/embodiment described in the present disclosure may be used individually or in combinations, or may be used by switching in execution. In addition, the processing procedures, sequences, flowcharts, and the like of each aspect/embodiment that have been described in the present disclosure may be re-ordered as long as inconsistencies do not arise. For example, as for various methods that have been described in the present disclosure, the elements of various steps are presented by use of exemplary orders, and thus the specific orders presented herein are by no means limiting.

Each aspect/embodiment described in the present disclosure may be applied to long term evolution (LTE), LTE-Advanced (LTE-A), LTE-Beyond (LTE-B), SUPER 3G, IMT-Advanced, 4th generation mobile communication system (4G), 5th generation mobile communication system (5G), future radio access (FRA), New-radio access technology (RAT), new radio (NR), new radio access (NX), future generation radio access (FX), global system for mobile communications (GSM) (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), systems that use other appropriate radio communication methods, next generation systems that are enhanced on the basis of these, and the like. Furthermore, a plurality of systems may be combined (for example, a combination of LTE or LTE-A and 5G) and applied.

The phrase "on the basis of" as used in the present disclosure does not mean "on the basis of only", unless otherwise specified. In other words, the phrase "on the basis of" means both "on the basis of only" and "on the basis of at least".

Any reference to the elements with designations such as "first", "second", and the like as used in the present disclosure does not generally limit the number or order of these elements. These designations can be used in the present disclosure, as a convenient way of distinguishing between two or more elements. Therefore, reference to the first and second elements does not imply that only two elements may be employed, or that the first element must precede the second element in some way.

The terms "determining" as used in the present disclosure may encompass a wide variety of operations. For example, "determining" may be regarded as determination of judging, calculating, computing, processing, deriving, investigating, looking up, search, inquiry (for example, looking up in a table, a data base, or another data structure), ascertaining, and the like.

"Determining" may be regarded as determination of receiving (for example, receiving information), transmitting (for example, transmitting information), inputting, outputting, accessing (for example, accessing data in a memory), and the like.

"Determining" may be regarded as determination of resolving, selecting, choosing, establishing, comparing, and the like. In other words, "determining" as used herein may be regarded as determination of some operation.

"Determining" may be read as "assuming", "expecting", "considering", and the like.

The term "maximum transmit power" described in the present disclosure may mean the maximum value of transmit power, the nominal UE maximum transmit power, or the rated UE maximum transmit power.

The terms "connected" and "coupled", or all variations of these terms as used in the present disclosure, mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be read as "access".

In a case where two elements are connected in the present disclosure, it is considerable that the two elements are "connected" or "coupled" to each other by use of one or more electrical wires, cables, printed electrical connections, and the like, and, as some non-limiting and non-inclusive examples, by use of, for example, electromagnetic energy having wavelengths in a radio frequency domain, a microwave domain, or an optical (both visible and invisible) domain.

The phrase "A and B are different" in the present disclosure may mean "A and B are different from each other". The terms such as "leave" and "coupled" may be interpreted similarly.

In a case where the terms such as "include", "including", and variations thereof are used in the present disclosure, these terms are intended to be inclusive, similarly to the term "comprising". Furthermore, the term "or" as used in the present disclosure is intended to be not an exclusive-OR.

For example, in a case where an article such as "a", "an", and "the" in English is added due to translation in the present disclosure, the present disclosure may include that the noun following such an article is in the plural.

Now, although the invention according to the present disclosure has been described in detail above, it should be obvious to a person skilled in the art that the invention according to the present disclosure is by no means limited to the embodiment described in the present disclosure. The invention according to the present disclosure can be embodied with various corrections and in various modified aspects, without departing from the spirit and scope of the invention defined on the basis of the description of claims. Therefore, the description in the present disclosure is provided for the purpose of explaining examples, and thus should by no means be construed to limit the invention according to the present disclosure in any way.

The invention claimed is:

1. A terminal comprising:
a receiver that receives first downlink control information (DCI) for scheduling transmission of an uplink shared channel (PUSCH) corresponding to one of different services, and receives a second DCI for performing a cancel instruction for the transmission of the PUSCH, the second DCI being transmitted by using a common search space for terminals and being different from the first DCI; and
a processor that:
when the transmission of the PUSCH is instructed by the second DCI to be canceled and when, in a determination of a modulation order and code rate for the transmission of the PUSCH, the processor uses a first modulation and coding scheme (MCS) table corresponding to a first service included in the different services, controls to cancel part of the transmission of the PUSCH, corresponding to the first service, scheduled, and
when, in the determination, the processor uses a second MCS table corresponding to a second service included in the different services, controls to transmit the PUSCH corresponding to the second service.

2. The terminal according to claim 1, wherein the second MCS table specifies a code rate that is lower than a smallest code rate specified in the first MCS table.

3. A radio communication method for a terminal, comprising:
receiving first downlink control information (DCI) for scheduling transmission of an uplink shared channel (PUSCH) corresponding to one of different services, and receiving a second DCI for performing a cancel instruction for the transmission of the PUSCH, the second DCI being transmitted by using a common search space for terminals and being different from the first DCI; and
when the transmission of the PUSCH is instructed by the second DCI to be canceled and when, in a determination of a modulation order and code rate for the transmission of the PUSCH, the terminal uses a first modulation and coding scheme (MCS) table corresponding to a first service included in the different services, controlling to cancel part of the transmission of the PUSCH, corresponding to the first service, scheduled, and
when, in the determination, the terminal uses a second MCS table corresponding to a second service included in the different services, controlling to transmit the PUSCH corresponding to the second service.

4. A base station comprising:
a transmitter that transmits first downlink control information (DCI) for scheduling transmission of an uplink shared channel (PUSCH) corresponding to one of different services, and transmits a second DCI for performing a cancel instruction for the transmission of the PUSCH, the second DCI being transmitted by using a common search space for terminals and being different from the first DCI; and
a processor that:
when the processor instructs via the second DCI to cancel the transmission of the PUSCH and when, in a determination of a modulation order and code rate for the transmission of the PUSCH, a first modulation and coding scheme (MCS) table corresponding to a first service included in the different services is used, controls to determine that part of the PUSCH, corresponding to the first service, scheduled is not transmitted, and
when, in the determination, a second MCS table corresponding to a second service included in the different services is used, controls to determine that the PUSCH, corresponding to the second service, is transmitted.

5. A system comprising a terminal and a base station, wherein
the terminal comprises:
a receiver that receives first downlink control information (DCI) for scheduling transmission of an uplink shared channel (PUSCH) corresponding to one of different services, and receives a second DCI for performing a cancel instruction for the transmission of the PUSCH, the second DCI being transmitted by using a common search space for terminals and being different from the first DCI; and
a processor that:
when the transmission of the PUSCH is instructed by the second DCI to be canceled and when, in a determination of a modulation order and code rate for the transmission of the PUSCH, the processor uses a first modulation and coding scheme (MCS) table corresponding to a first service included in the different services, controls to cancel part of the transmission of the PUSCH, corresponding to the first service, scheduled, and
when, in the determination, the processor uses a second MCS table corresponding to a second service included in the different services, controls to transmit the PUSCH corresponding to the second service, and
the base station comprises:
a transmitter that transmits the first DCI and the second DCI; and a processor that:
- when the processor instructs via the second DCI to cancel the transmission of the PUSCH and when, in the determination of a modulation order and code rate for the transmission of the PUSCH, the first MCS table is used, controls to determine that part of the PUSCH, corresponding to the first service, scheduled is not transmitted, and
- when, in the determination, the second MCS table is used, controls to determine that the PUSCH, corresponding to the second service, is transmitted.

* * * * *